US011825074B2

(12) United States Patent
Zhang et al.

(10) Patent No.: US 11,825,074 B2
(45) Date of Patent: Nov. 21, 2023

(54) GENERATION AND USAGE OF COMBINED AFFINE MERGE CANDIDATE

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 38 days.

(21) Appl. No.: 17/220,301

(22) Filed: Apr. 1, 2021

(65) Prior Publication Data

US 2021/0227207 A1 Jul. 22, 2021

Related U.S. Application Data

(63) Continuation of application No. PCT/IB2019/058543, filed on Oct. 8, 2019.

(30) Foreign Application Priority Data

Oct. 8, 2018 (WO) ................ PCT/CN2018/109329

(51) Int. Cl.
*H04N 19/00* (2014.01)
*H04N 19/105* (2014.01)
(Continued)

(52) U.S. Cl.
CPC ......... *H04N 19/105* (2014.11); *H04N 19/159* (2014.11); *H04N 19/176* (2014.11); *H04N 19/184* (2014.11)

(58) Field of Classification Search
CPC ...................................................... H04N 19/00
See application file for complete search history.

(56) References Cited

U.S. PATENT DOCUMENTS 8,964,845 B2  2/2015  Li et al.
9,271,013 B2  2/2016  Li et al.
(Continued)

FOREIGN PATENT DOCUMENTS

| CN | 106105191 A | 11/2016 |
| CN | 108432250 A | 8/2018 |
| TW | 201739252 A | 11/2017 |

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

(Continued)

*Primary Examiner* — Maryam A Nasri
(74) *Attorney, Agent, or Firm* — Perkins Coie LLP

(57) ABSTRACT

Generation and usage of combined affine merge candidate are described. In a representative aspect, a method of video processing includes: generating, during a conversion between a current block of video and a bitstream of the video, an updated merge candidate list by adding at least one combined merge candidate to a first merge candidate list; and performing the conversion by using the updated merge candidate list, wherein the first merge candidate list includes one or more sub-block prediction based merge candidates.

17 Claims, 13 Drawing Sheets

(51) Int. Cl.
*H04N 19/159* (2014.01)
*H04N 19/176* (2014.01)
*H04N 19/184* (2014.01)

(56) References Cited

U.S. PATENT DOCUMENTS

| | | | |
|---|---|---|---|
| 9,432,685 | B2 | 8/2016 | Chon et al. |
| 9,525,861 | B2 | 12/2016 | Zhang et al. |
| 9,591,325 | B2 | 3/2017 | Li et al. |
| 9,609,347 | B2 | 3/2017 | Thirumalai et al. |
| 9,716,899 | B2 | 7/2017 | Thirumalai et al. |
| 9,800,895 | B2 | 10/2017 | Thirumalai et al. |
| 9,924,168 | B2 | 3/2018 | Zhang et al. |
| 10,045,014 | B2 | 8/2018 | Zhang et al. |
| 10,057,594 | B2 | 8/2018 | Xiu et al. |
| 10,110,922 | B2 | 10/2018 | Zhang et al. |
| 10,110,923 | B2 | 10/2018 | Zhang et al. |
| 10,165,252 | B2 | 12/2018 | An et al. |
| 10,200,709 | B2 | 2/2019 | Chen et al. |
| 10,382,766 | B2 | 8/2019 | Karczewicz et al. |
| 10,560,718 | B2 | 2/2020 | Lee et al. |
| 10,587,859 | B2 | 3/2020 | An et al. |
| 10,721,489 | B2 | 7/2020 | Chen et al. |
| 2013/0336406 | A1 | 12/2013 | Zhang et al. |
| 2015/0341664 | A1 | 11/2015 | Zhang et al. |
| 2016/0219278 | A1 | 7/2016 | Chen et al. |
| 2017/0289566 | A1 | 10/2017 | He et al. |
| 2018/0098063 | A1 | 4/2018 | Chen et al. |
| 2018/0343463 | A1 | 11/2018 | Xiu et al. |
| 2019/0028731 | A1* | 1/2019 | Chuang ............... H04N 19/159 |
| 2019/0058896 | A1 | 2/2019 | Huang et al. |
| 2019/0349590 | A1 | 11/2019 | Karczewicz et al. |
| 2020/0366928 | A1 | 11/2020 | Liu et al. |
| 2021/0029374 | A1 | 1/2021 | Zhang et al. |
| 2021/0058637 | A1 | 2/2021 | Zhang et al. |
| 2021/0076029 | A1 | 3/2021 | Han et al. |
| 2021/0076050 | A1 | 3/2021 | Zhang et al. |
| 2021/0105463 | A1 | 4/2021 | Zhang et al. |

OTHER PUBLICATIONS

Chen et al. "CE4: Affine Merge Enhancement (Test 2.10)," Joint Video Experts Team (JVET) of ITU-T SG 16 WP 3 and iSO/IEC JTC 1/SC 29/WG 11, 11th Meeting, Ljubljana, SI, Jul. 10-18, 2018, document JVET-K0186, 2018.

Chen et al. "CE4: Common Base for Affine Merge Mode (Test 4.2.1)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0366, 2018.

Chen et al. "CE4: Affine Merge Enhancement with Simplification (Test 4.2.2)," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0368, 2018.

Hsiao et al. "CE4.4.12: Pairwise Average Candidates," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0090, 2019.

H.265/HEVC, https://www.itu.int/rec/T-REC-H.265.

JEM-7.0: https://jvet.hhi.fraunhofer.de/svn/svn_HMJEMSoftware/tags/HM-16.6-JEM-7.0.

Xiu et al. "CE4.2.5: Simplifications on Advanced Temporal Motion Vector Prediction (ATMVP)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0341, 2018.

Yang et al. "CE4-Related: Control Point MV Offset for Affine Merge Mode," Joint Video Experts Team (JVET) of ITU-1 SG 16 WP 3 and ISO/IEC JTC 1/SC 29/WG 11, 12th Meeting, Macao, CN, Oct. 3-12, 2018, document JVET-L0389, 2018.

International Search Report and Written Opinion from International Patent Application No. PCT/IB2019/058543 dated Dec. 18, 2019 (15 pages).

* cited by examiner

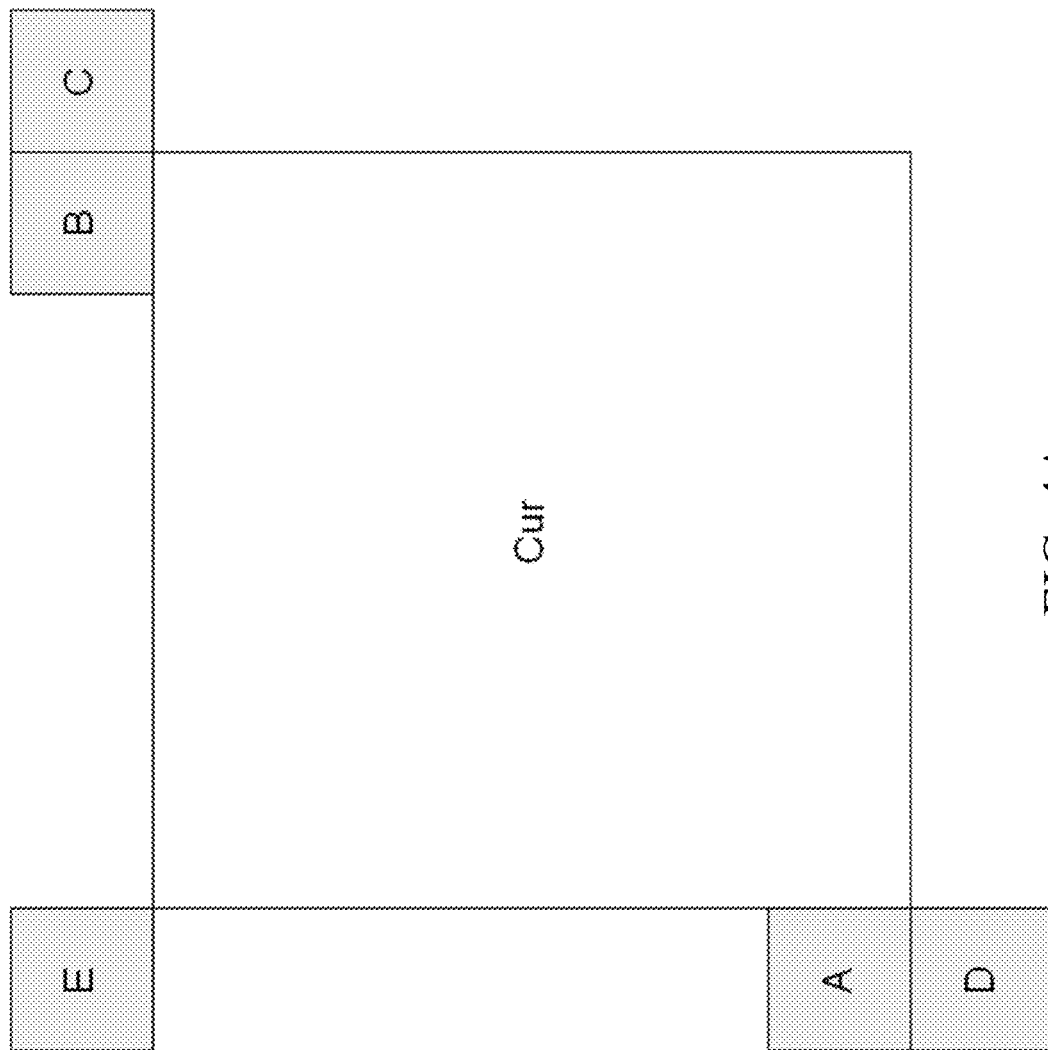

GENERATION AND USAGE OF COMBINED AFFINE MERGE CANDIDATE

CROSS-REFERENCE TO RELATED APPLICATION

This application is a continuation of International Patent Application No. PCT/IB2019/058543, filed on Oct. 8, 2019, which claims the priority to and benefits of International Patent Application No. PCT/CN2018/109329, filed on Oct. 8, 2018. The entire disclosures of all the aforementioned patent applications are incorporated by reference as part of the disclosure of this application.

TECHNICAL FIELD

This patent document is directed generally to image and video coding technologies.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to combined affine merge candidates for visual media coding are described. The described methods may be applied to both the existing video coding standards (e.g., High Efficiency Video Coding (HEVC)) and future video coding standards or video codecs.

In one representative aspect, the disclosed technology may be used to provide a method for video coding. This method includes generating, for a bitstream representation of a current block, an updated merge candidate list by adding at least one combined merge candidate to a merge candidate list, and performing, based on the updated merge candidate list, a conversion between the bitstream representation and the current block.

In another representative aspect, a method of video processing is disclosed. The method includes: generating, during a conversion between a current block of video and a bitstream representation of the current block, an updated merge candidate list by adding at least one combined merge candidate to a first merge candidate list; and performing the conversion by using the updated merge candidate list.

In another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIGS. 4A and 4B show example candidates for the AF_MERGE affine motion mode.

DETAILED DESCRIPTION

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding (VVC) standard to be finalized, or other current and/or future video coding standards.

Figure 1:
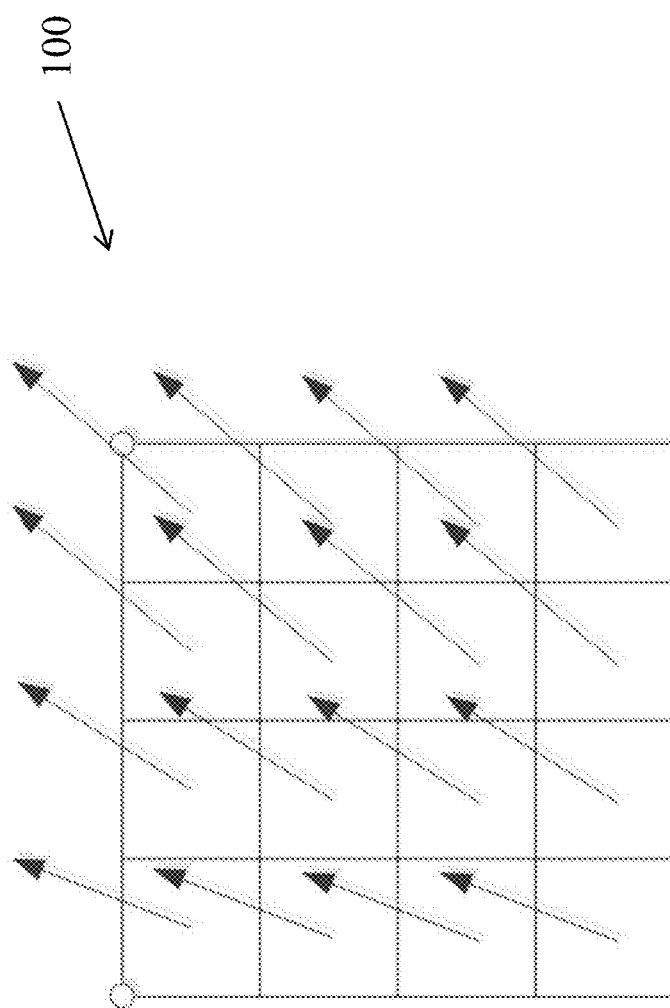
FIG. 1 shows an example of sub-block based prediction.

Sub-block based prediction is first introduced into the video coding standard by the High Efficiency Video Coding (HEVC) standard. With sub-block based prediction, a block, such as a Coding Unit (CU) or a Prediction Unit (PU), is divided into several non-overlapped sub-blocks. Different sub-blocks may be assigned different motion information, such as reference index or motion vector (MV), and motion compensation (MC) is performed individually for each sub-block. FIG. 1 shows an example of sub-block based prediction.

Embodiments of the disclosed technology may be applied to existing video coding standards (e.g., HEVC, H.265) and future standards to improve runtime performance. Section headings are used in the present document to improve readability of the description and do not in any way limit the discussion or the embodiments (and/or implementations) to the respective sections only.

1. Examples of the Joint Exploration Model (JEM)

In some embodiments, future video coding technologies are explored using a reference software known as the Joint Exploration Model (JEM). In JEM, sub-block based prediction is adopted in several coding tools, such as affine prediction, alternative temporal motion vector prediction (ATMVP), spatial-temporal motion vector prediction (STMVP), bi-directional optical flow (BIO), Frame-Rate Up Conversion (FRUC). Affine prediction has also been adopted into VVC.

1.1 Examples of Affine Prediction

Figure 2A:
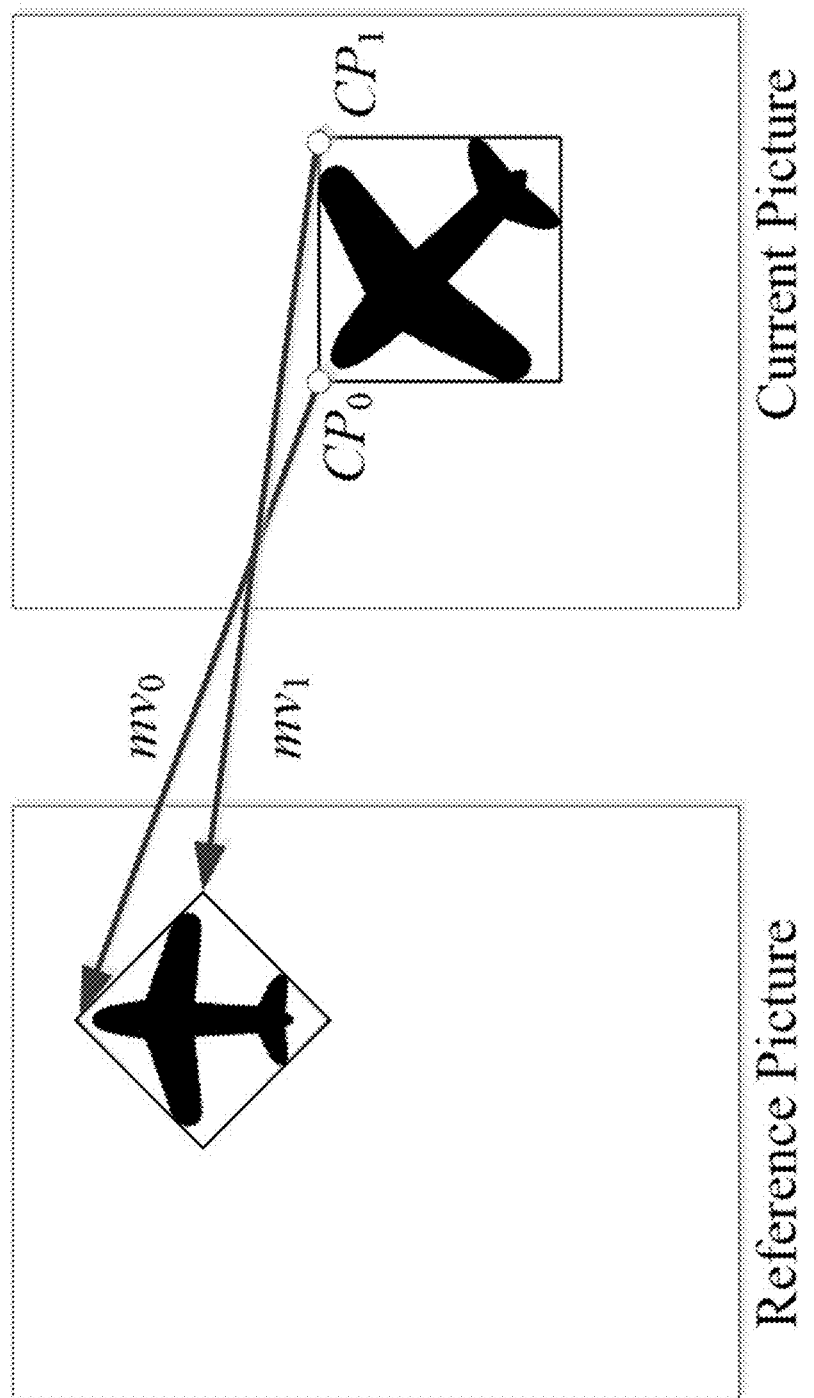
FIGS. 2A and 2B show examples of the simplified 4-parameter affine model and the simplified 6-parameter affine model, respectively.
Figure 2B:
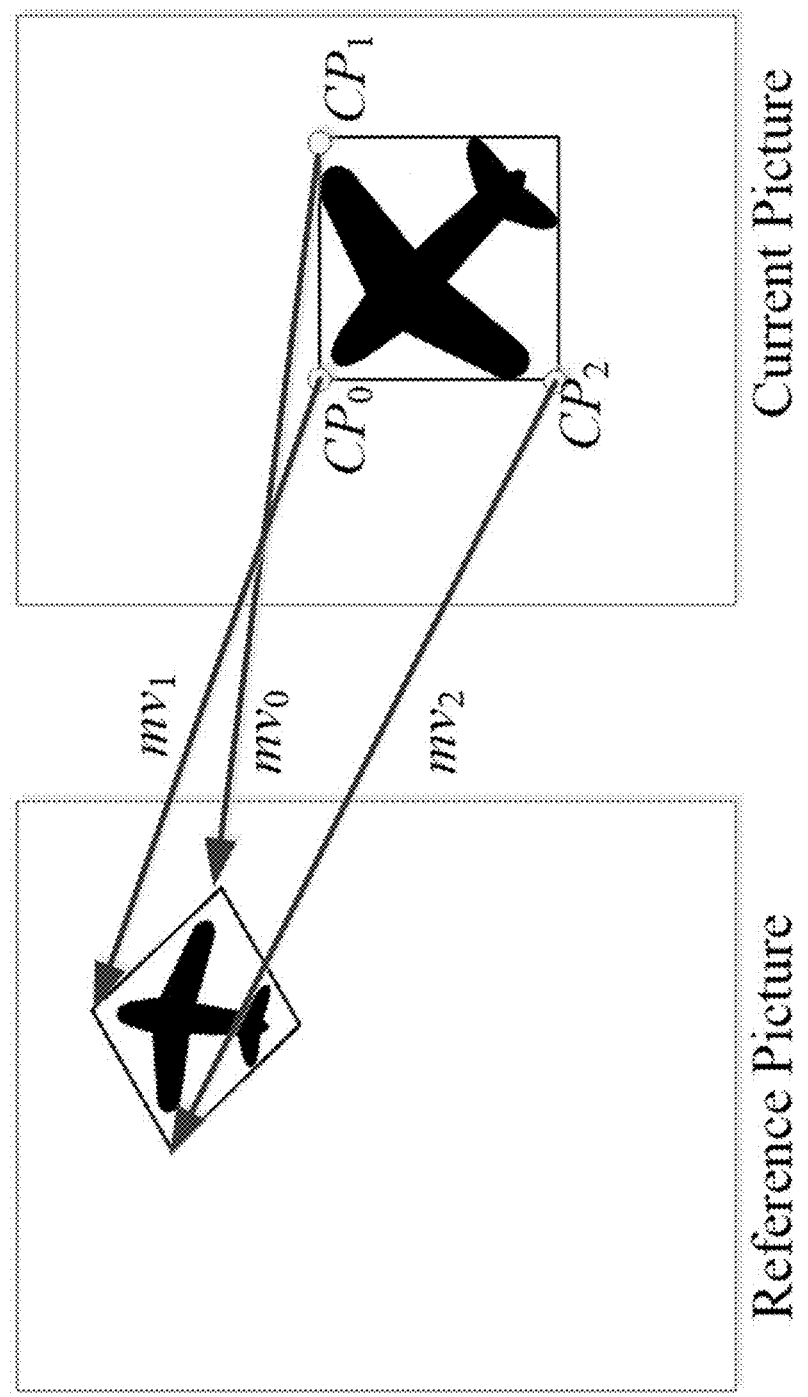

In HEVC, only a translation motion model is applied for motion compensation prediction (MCP). While in the real world, there are many kinds of motion, e.g. zoom in/out, rotation, perspective motions and the other irregular motions. In the VVC, a simplified affine transform motion compensation prediction is applied. As shown in FIGS. 2A and 2B, the affine motion field of the block is described by two (in the 4-parameter affine model) or three (in the 6-parameter affine model) control point motion vectors, respectively.

The motion vector field (MVF) of a block is described by the following equation with the 4-parameter affine model and 6-parameter affine model respectively:

$$\begin{cases} mv^h(x, y) = ax - by + c = \frac{(mv_1^h - mv_0^h)}{w}x - \frac{(mv_1^v - mv_0^v)}{w}y + mv_0^h \\ mv^v(x, y) = bx + ay + d = \frac{(mv_1^v - mv_0^v)}{w}x + \frac{(mv_1^h - mv_0^h)}{w}y + mv_0^v \end{cases} \quad \text{Eq. (1)}$$

$$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad \text{Eq. (2)}$$

Herein, $(mv^h_0, mv^h_0)$ is motion vector of the top-left corner control point (CP), and $(mv^h_1, mv^h_1)$ is motion vector of the top-right corner control point and $(mv^h_2, mv^h_2)$ is motion vector of the bottom-left corner control point, (x, y) represents the coordinate of a representative point relative to the top-left sample within current block. The CP motion vectors may be signaled (like in the affine AMVP mode) or derived on-the-fly (like in the affine merge mode). w and h are the width and height of the current block. In practice, the division is implemented by right-shift with a rounding operation. In VVC Test model (VTM), the representative point is defined to be the center position of a sub-block, e.g., when the coordinate of the left-top corner of a sub-block relative to the top-left sample within current block is (xs, ys), the coordinate of the representative point is defined to be (xs+2, ys+2).

In a division-free design, Equations (1) and (2) are implemented as:

$$\begin{cases} iDMvHorX = (mv_1^h - mv_0^h) << (S - \log2(w)) \\ iDMvHorY = (mv_1^v - mv_0^v) << (S - \log2(w)) \end{cases} \quad \text{Eq. (3)}$$

For the 4-parameter affine model shown in Equation (1):

$$\begin{cases} iDMvVerX = -iDMvHorY \\ iDMvVerY = iDMvHorX \end{cases} \quad \text{Eq. (4)}$$

For the 6-parameter affine model shown in Equation (2):

$$\begin{cases} iDMvVerX = (mv_2^h - mv_0^h) << (S - \log2(h)) \\ iDMvVerY = (mv_2^v - mv_0^v) << (S - \log2(h)) \end{cases} \quad \text{Eq. (5)}$$

And thus, the motion vectors may be derived as:

$$\begin{cases} mv^h(x, y) = \text{Normalize}(iDMvHorX \cdot x + \\ \quad iDMvVerX \cdot y + (mv_0^h << S), S) \\ mv^v(x, y) = \text{Normalize}(iDMvHorY \cdot x + \\ \quad iDMvVerY \cdot y + (mv_0^v << S), S) \end{cases} \quad \text{Eq. (6)}$$

$$\text{Normalize}(Z, S) = \begin{cases} (Z + \text{Off}) >> S & \text{if } Z \geq 0 \\ -((-Z + \text{Off}) >> S) & \text{Otherwise} \end{cases} \quad \text{Eq. (7)}$$

$$\text{Off} = 1 << (S - 1)$$

Herein, S represents the calculation precision. e.g. in VVC, S=7. In VVC, the MV used in MC for a sub-block with the top-left sample at (xs, ys) is calculated by Equation (6) with x=xs+2 and y=ys+2.

Figure 3:
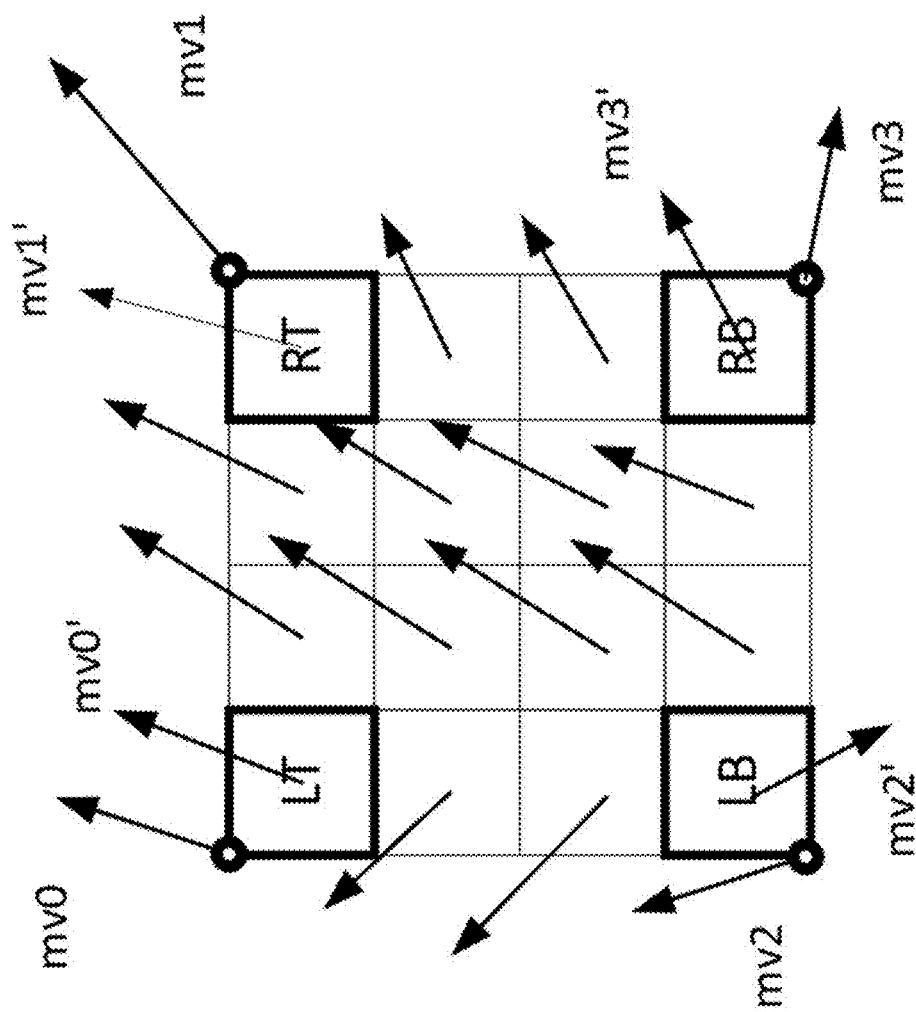
FIG. 3 shows an example of an affine motion vector field (MVF) per sub-block.

To derive motion vector of each 4×4 sub-block, the motion vector of the center sample of each sub-block, as shown in FIG. 3, is calculated according to Equations (1) or (2), and rounded to 1/16 fraction accuracy. Then the motion compensation interpolation filters are applied to generate the prediction of each sub-block with derived motion vector.

Figure 4B:
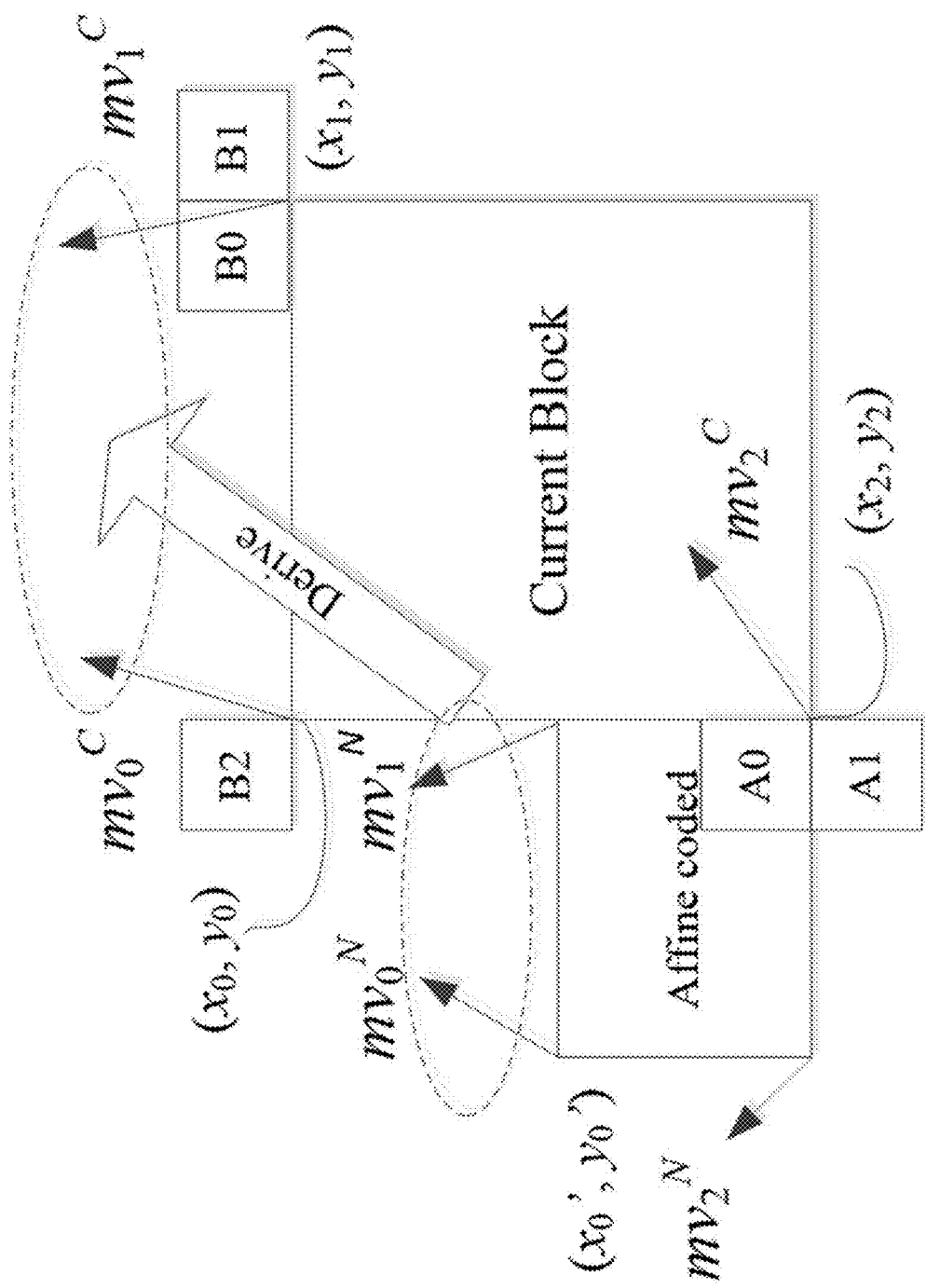

Affine model can be inherited from spatial neighbouring affine-coded block such as left, above, above right, left bottom and above left neighbouring block as shown in FIG. 4A. For example, if the neighbour left bottom block A in FIG. 4A is coded in affine mode as denoted by A0 in FIG. 4B, the Control Point (CP) motion vectors $mv_0^N$, $mv_1^N$ and $mv_2^N$ of the top left corner, above right corner and left bottom corner of the neighbouring CU/PU which contains the block A are fetched. And the motion vector $mv_0^C$, $mv_1^C$ and $mv_2^C$ (which is only used for the 6-parameter affine model) of the top left corner/top right/bottom left on the current CU/PU is calculated based on $mv_0^N$, $mv_1^N$ and $mv_2^N$.

In some embodiments (e.g., VTM-2.0), sub-block (e.g. 4×4 block in VTM) LT stores mv0, RT stores mv1 if the current block is affine coded. If the current block is coded with the 6-parameter affine model, LB stores mv2; otherwise (with the 4-parameter affine model), LB stores mv2'. Other sub-blocks stores the MVs used for MC.

In some embodiments, when a CU is coded with affine merge mode, e.g., in AF_MERGE mode, it gets the first block coded with affine mode from the valid neighbour reconstructed blocks. And the selection order for the candidate block is from left, above, above right, left bottom to above left as shown in FIG. 4A.

The derived CP MVs $mv_0^C$, $mv_1^C$ and $mv_2^C$ of current block can be used as CP MVs in the affine merge mode. Or they can be used as MVP for affine inter mode in VVC. It should be noted that for the merge mode, if the current block is coded with affine mode, after deriving CP MVs of current block, the current block may be further split into multiple sub-blocks and each block will derive its motion information based on the derived CP MVs of current block.

2. Other Exemplary Embodiments

Different from VTM wherein only one affine spatial neighboring block may be used to derive affine motion for a block, in other embodiments, it proposes to construct a separate list of affine candidates for the AF_MERGE mode.

(1) Insert Inherited Affine Candidates into Candidate List

In an example, inherited affine candidate means that the candidate is derived from the valid neighbor reconstructed block coded with affine mode.

Figure 5:
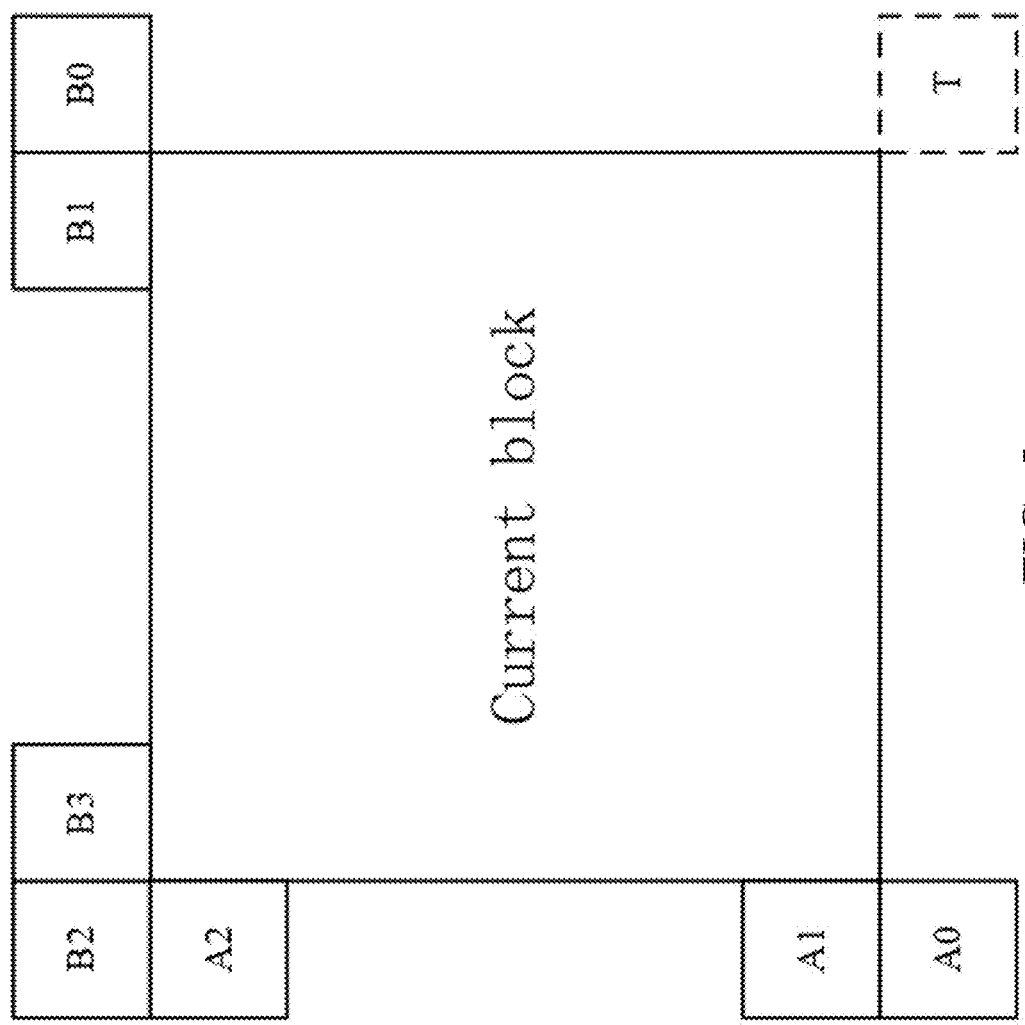
FIG. 5 shows an example of candidate positions for affine merge mode.

As shown in FIG. 5, the scan order for the candidate block is $A_1$, $B_1$, $B_0$, $A_0$ and $B_2$. When a block is selected (e.g., $A_1$), the two-step procedure is applied:

(a) Firstly, use the three corner motion vectors of the CU covering the block to derive two/three control points of current block; and (b) Based on the control points of current block to derive sub-block motion for each sub-block within current block.

(2) Insert Constructed Affine Candidates

In some embodiments, if the number of candidates in affine merge candidate list is less than MaxNumAffineCand, constructed affine candidates are insert into the candidate list.

Constructed affine candidate means the candidate is constructed by combining the neighbor motion information of each control point.

The motion information for the control points is derived firstly from the specified spatial neighbors and temporal neighbor shown in FIG. 5. CPk (k=1, 2, 3, 4) represents the k-th control point. $A_0$, $A_1$, $A_2$, $B_0$, $B_1$, $B_2$ and $B_3$ are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is $B_2 \rightarrow B_3 \rightarrow A_2$. $B_2$ is used if it is available. Otherwise, if $B_2$ is unavailable, $B_3$ is used. If both $B_2$ and $B_3$ are unavailable, $A_2$ is used. If all the three candidates are unavailable, the motion information of CP1 cannot be obtained.

For CP2, the checking priority is B1→B0;
For CP3, the checking priority is A1→A0;
For CP4, T is used.

Secondly, the combinations of controls points are used to construct the motion model.

Motion vectors of three control points are needed to compute the transform parameters in 6-parameter affine model. The three control points can be selected from one of the following four combinations ({CP1, CP2, CP4}, {CP1, CP2, CP3}, {CP2, CP3, CP4}, {CP1, CP3, CP4}). For example, use CP1, CP2 and CP3 control points to construct 6-parameter affine motion model, denoted as Affine (CP1, CP2, CP3).

Motion vectors of two control points are needed to compute the transform parameters in 4-parameter affine model. The two control points can be selected from one of the following six combinations ({CP1, CP4}, {CP2, CP3}, {CP1, CP2}, {CP2, CP4}, {CP1, CP3}, {CP3, CP4}). For example, use the CP1 and CP2 control points to construct 4-parameter affine motion model, denoted as Affine (CP1, CP2).

The combinations of constructed affine candidates are inserted into to candidate list as following order:

{CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

(3) Insert Zero Motion Vectors

If the number of candidates in affine merge candidate list is less than MaxNumAffineCand, zero motion vectors are insert into the candidate list, until the list is full.

3. Examples of Advanced Temporal Motion Vector Prediction (ATMVP)

In some existing implementations (e.g., 10th JVET meeting), advanced temporal motion vector prediction (ATMVP) was included in the benchmark set (BMS)-1.0 reference software, which derives multiple motion for sub-blocks of one coding unit (CU) based on the motion information of the collocated blocks from temporal neighboring pictures. Although it improves the efficiency of temporal motion vector prediction, the following complexity issues are identified for the existing ATMVP design:

The collocated pictures of different ATMVP CUs may not be the same if multiple reference pictures are used. This means the motion fields of multiple reference pictures need to be fetched.

The motion information of each ATMVP CU is always derived based on 4×4 units, resulting in multiple invocations of motion derivation and motion compensation for each 4×4 sub-block inside one ATMVP CU.

Some further simplifications on ATMVP were proposed and have been adopted in VTM2.0.

3.1 Examples of Simplified Collocated Block Derivation with One Fixed Collocated Picture In this exemplary method, one simplified design is proposed to use the same collocated picture as in HEVC, which is signaled at the slice header, as the collocated picture for ATMVP derivation. At the block level, if the reference picture of a neighboring block is different from this collocated picture, the MV of the block is scaled using the HEVC temporal MV scaling method, and the scaled MV is used in ATMVP.

Denote the motion vector used to fetch the motion field in the collocated picture $R_{col}$ as $MV_{col}$. To minimize the impact due to MV scaling, the MV in the spatial candidate list used to derive $MV_{col}$ is selected in the following way: if the reference picture of a candidate MV is the collocated picture, this MV is selected and used as $MV_{col}$ without any scaling. Otherwise, the MV having a reference picture closest to the collocated picture is selected to derive $MV_{col}$ with scaling.

3.2 Examples of Adaptive ATMVP Sub-Block Size

In this exemplary method, it is proposed to support the slice-level adaptation of the sub-block size for the ATMVP motion derivation. Specifically, one default sub-block size that is used for the ATMVP motion derivation is signaled at sequence level. Additionally, one flag is signaled at slice-level to indicate if the default sub-block size is used for the current slice. If the flag is false, the corresponding ATMVP sub-block size is further signaled in the slice header for the slice.

4. Examples of Spatial-Temporal Motion Vector Prediction (STMVP)

Figure 6:
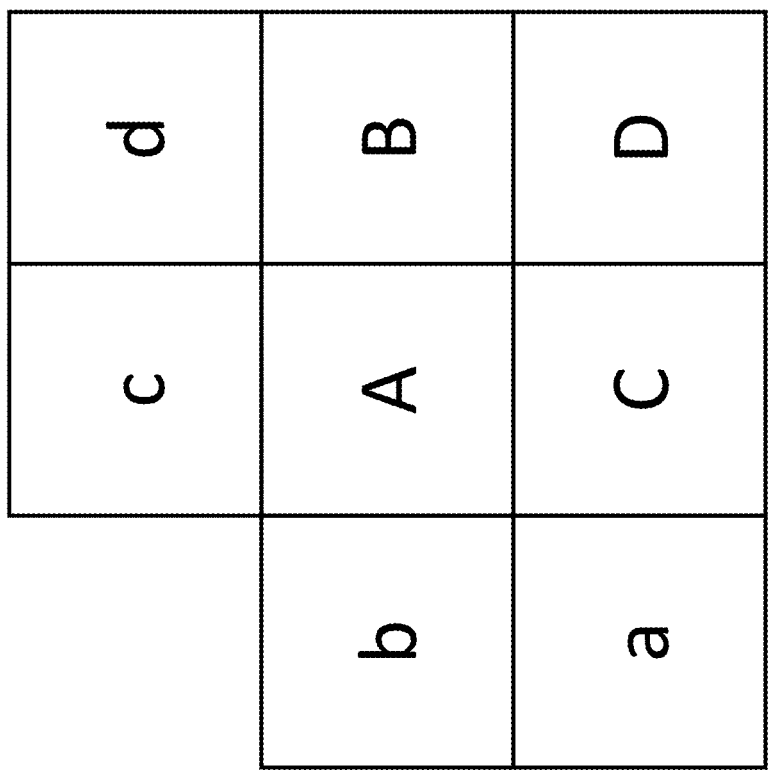
FIG. 6 shows an example of one coding unit (CU) with sub-blocks and neighboring blocks of the CU.

In the STMVP method, the motion vectors of the sub-CUs are derived recursively, following raster scan order. FIG. 6 shows an example of one CU with four sub-blocks and neighboring blocks. Consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

5. Exemplary Embodiments of Affine Merge Candidate Lists

5.1 Embodiments in JVET-L0366

In the affine merge mode of VTM-2.0.1, only the first available affine neighbour can be used to derive motion information of affine merge mode. In JVET-L0366, a candidate list for affine merge mode is constructed by searching valid affine neighbours and combining the neighbor motion information of each control point.

The affine merge candidate list is constructed as following steps:

(1) Insert Inherited Affine Candidates

Inherited affine candidate means that the candidate is derived from the affine motion model of its valid neighbor affine coded block. In the common base, as shown in FIG. 5, the scan order for the candidate positions is: A1, B1, B0, A0 and B2.

After a candidate is derived, full pruning process is performed to check whether same candidate has been inserted into the list. If a same candidate exists, the derived candidate is discarded.

(2) Insert Constructed Affine Candidates

If the number of candidates in affine merge candidate list is less than MaxNumAffineCand (set to 5 in this example), constructed affine candidates are inserted into the candidate list. Constructed affine candidate means the candidate is constructed by combining the neighbor motion information of each control point.

The motion information for the control points is derived firstly from the specified spatial neighbors and temporal neighbor shown in FIG. 5. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is $B_2 \rightarrow B_3 \rightarrow A_2$. $B_2$ is used if it is available. Otherwise, if $B_2$ is unavailable, $B_3$ is used. If both $B_2$ and $B_3$ are unavailable, $A_2$ is used. If all the three candidates are unavailable, the motion information of CP1 cannot be obtained.

For CP2, the checking priority is $B_1 \rightarrow B_0$;

0 For CP3, the checking priority is $A_1 \rightarrow A_0$;

For CP4, T is used.

Secondly, the combinations of controls points are used to construct the motion model.

Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

Motion information of two control points are needed to construct a 4-parameter affine candidate. The two control points can be selected from one of the following six combinations ({CP1, CP4}, {CP2, CP3}, {CP1, CP2}, {CP2, CP4}, {CP1, CP3}, {CP3, CP4}). Combinations {CP1, CP4}, {CP2, CP3}, {CP2, CP4}, {CP1, CP3}, {CP3, CP4} will be converted to a 4-parameter motion model represented by top-left and top-right control points.

The combinations of constructed affine candidates are inserted into to candidate list as following order:

{CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

For reference list X (X being 0 or 1) of a combination, the reference index with highest usage ratio in the control points is selected as the reference index of list X, and motion vectors point to difference reference picture will be scaled.

After a candidate is derived, full pruning process is performed to check whether same candidate has been inserted into the list. If a same candidate exists, the derived candidate is discarded.

(3) Padding with Zero Motion Vectors

If the number of candidates in affine merge candidate list is less than 5, zero motion vectors with zero reference indices are insert into the candidate list, until the list is full.

5.2 Embodiments of Affine Merge Mode in JVET-L0368

In an existing implementation, JVET-L0368 proposes the following simplifications for the affine merge mode in JVET-L0366:

(1) The pruning process for inherited affine candidates is simplified by comparing the coding units covering the neighboring positions, instead of comparing the derived affine candidates in VTM-2.0.1. Up to 2 inherited affine candidates are inserted into affine merge list. The pruning process for constructed affine candidates is totally removed.

(2) The MV scaling operation in constructed affine candidate is removed. If the reference indices of control points are different, the constructed motion model is discarded.

(3) The number of constructed affine candidates is reduced from 10 to 6.

(4) It is also proposed that other merge candidates with sub-block prediction such as ATMVP is also put into the affine merge candidate list. In that case, the affine merge candidate list may be renamed with some other names such as sub-block merge candidate list.

6. Examples of Pairwise Average Candidates in JVET-L0090

Pairwise average candidates are generated by averaging predefined pairs of candidates in the current merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid. The pairwise average candidates replaces the combined candidates in HEVC standard.

7. Examples of Control Point Motion Vector (CPMV) Offset in JVET-L0389

New Affine merge candidates are generated based on the CPMVs offsets of the first Affine merge candidate. If the first Affine merge candidate enables 4-parameter Affine model, then 2 CPMVs for each new Affine merge candidate are derived by offsetting 2 CPMVs of the first Affine merge candidate; Otherwise (6-parameter Affine model enabled), then 3 CPMVs for each new Affine merge candidate are derived by offsetting 3 CPMVs of the first Affine merge candidate. In Uni-prediction, the CPMV offsets are applied to the CPMVs of the first candidate. In Bi-prediction with List 0 and List 1 on the same direction, the CPMV offsets are applied to the first candidate as follows:

$MV_{new(L0),i} = MV_{old(L0)} + MV_{offset(i)}$ $MV_{new(L1),i} = MV_{old(L1)} + MV_{offset(i)}$ In Bi-prediction with List 0 and List 1 on the opposite direction, the CPMV offsets are applied to the first candidate as follows:

$MV_{new(L0),i} = MV_{old(L0)} + MV_{offset(i)}$ $MV_{new(L1),i} = MV_{old(L1)} - MV_{offset(i)}$ In this embodiment, various offset directions with various offset magnitudes are used to generate new Affine merge candidates. Two implementations were tested:

(1) 16 new Affine merge candidates with 8 different offset directions with 2 different offset magnitudes are generated as shown in the following offsets set:

Offset set=1 (4, 0), (0, 4), (−4, 0), (0, −4), (−4, −4), (4, −4), (4, 4), (−4, 4), (8, 0), (0, 8), (−8, 0), (0, −8), (−8, −8), (8, −8), (8, 8), (−8, 8) 1.

The Affine merge list is increased to 20 for this design. The number of potential Affine merge candidates is 31 in total.

(2) 4 new Affine merge candidates with 4 different offset directions with 1 offset magnitude are generated as shown in the following offsets set:

Offset set={(4, 0), (0, 4), (−4, 0), (0, −4)}.

The Affine merge list is kept to 5 as VTM2.0.1 does. Four temporal constructed Affine merge candidates are removed to keep the number of potential Affine merge candidates unchanged, i.e., 15 in total. Suppose the coordinates of CPMV1, CPMV2, CPMV3 and CPMV4 are (0, 0), (W, 0), (H, 0) and (W, H). Note that CPMV4 is derived from the temporal MV as shown in FIG. 5. The removed candidates are the following four temporal-related constructed Affine merge candidates: {CP2, CP3, CP4}, {CP1, CP4}, {CP2, CP4}, {CP3, CP4}.

8. Examples of Multiple Hypotheses for Affine Models

Multi-hypothesis on CPMVs. In one example, there are N (N>=2) original affine models (e.g., those affine models associated with neighboring blocks) with CPMVs ($MV^0_1$, $MV^1_1$, $MV^2_1$) ... ($MV^0_N$, $MV^1_N$, $MV^2_N$). A combined affine model with CPMVs ($MV'^0$, $MV'^1$, $MV'^2$) can be derived from those affine models and the current block is predicted by the new affine model. ($MV^0$, $MV^1$, $MV^2$) represents the CPMV at the top-left corner, the top-right corner and bottom-left corner respectively. In the following discussion, MV is 2-dimension vector noted as (MVx, MVy). MV1+ MV2=MV3 means MV1x+MV2x=MV3x and MV1y+ MV2y=MV3y. k×MV1=MV2 means k×MV1x=MV2x and k×MV1y=MV2y.

For example, CPMVs of an original affine model may be derived from an affine-coded spatial or temporal neighboring block for the current block.

In one example, CPMVs of affine models derived from some affine-coded spatial neighboring block are not used to derive the new affine model to be used by the current block.

For example, CPMVs of an original affine model may be derived from a constructed affine model such as proposed in JVET-K0186.

In one example, CPMVs of some constructed affine models are not used to derive the new affine model to be used by the current block.

For example, ($MV'^0$, $MV'^1$, $MV'^2$)=(F0($MV^0_1$, ..., $MV^0_N$), F1($MV^1_1$, ..., $MV^1_N$), F2($MV^2_1$, ..., $MV^2_N$)), where F0, F1 and F2 are functions.

In one example, Fi may be defined to be average function.

For example, ($MV'^0$, $MV'^1$, $MV'^2$)=(Average($MV^0_1$, ..., $MV^0_N$), Average($MV^1_1$, ..., $MV^1_N$), Average($MV^2_1$, ..., $MV^2_N$)).

For example, $$(MV'^0, MV'^1, MV'^2) = \left(\sum_{i=1}^{N} w_i^0 MV_i^0 / \sum_{i=1}^{N} w_i^0, \sum_{i=1}^{N} w_i^1 MV_i^1 / \sum_{i=1}^{N} w_i^1, \sum_{i=1}^{N} w_i^2 MV_i^2 / \sum_{i=1}^{N} w_i^2\right).$$

In one example, $$(MV'^0, MV'^1, MV'^2) = \left(\text{Normalize}\left(\sum_{i=1}^{N} w_i^0 MV_i^0, P0\right),\right.$$

$$\left.\text{Normalize}\left(\sum_{i=1}^{N} w_i^1 MV_i^1, P1\right), \text{Normalize}\left(\sum_{i=1}^{N} w_i^2 MV_i^2, P2\right)\right),$$

where $\sum_{i=1}^{N} w_i^0 = 2^{P0}, \sum_{i=1}^{N} w_i^1 = 2^{P1}$ and $\sum_{i=1}^{N} w_i^2 = 2^{P2}$.

In one example, $w_i^0 = w_i^1 = w_i^2$ for all i.

In one example, N=2 and $w_i^0 = w_i^1 = w_i^2 = 1$ for i=1 and 2.

In one example, some CPMVs may not exist. For example, $MV^2_i$ does not exist, then $w_i^2$ is set to be 0.

In one example, only original affine models with 4 parameters are used to derive the CPMVs of the combined affine model.

In one example, only original affine models with 6 parameters are used to derive the CPMVs of the combined affine model.

In one example, an original affine model with 4 parameters are first converted into an affine model with 6-parameter before being used to derive the CPMVs of the combined affine model.

A 4-parameter affine model with two CPMVs ($MV^0_k$, $MV^1_k$) can be converted to a 6-parameter affine model with three CPMVs ($MV^0_k$, $MV^1_k$, $MV^2_k$) where $MV^2_k$ can be derived by Equation (1) with x=0 and y=h where h is the height of the affine-coded block with the 4-parameter affine model.

In one example, $DiffMV'^1 = MV'^1 - MV'^0$ and $DiffMV'^2 = MV'^2 - MV'^0$ can be derived from the N (N>=2) original affine models. Suppose $DiffMV_k^1 = MV_k^1 - MV_k^0$ and $DiffMV_k^2 = MV_k^2 - MV_k^2$.

For example, $(DiffMV'^1, DiffMV'^2) = (F1(DiffMV^1_1, \ldots, DiffMV^1_N), F2(DiffMV^2_1, \ldots, DiffMV^2_N))$, where F1 and F2 are functions.

For example, $(DiffMV'^1, DiffMV'^2) = (\text{Average}(DiffMV^1_1, \ldots, DiffMV^1_N), \text{Average}(DiffMV^2_1, \ldots, DiffMV^2_N))$.

For example, $$(DiffMV'^1, DiffMV'^2) = \left(\sum_{i=1}^{N} w_i^1 DiffMV_i^1 / \sum_{i=1}^{N} w_i^1, \sum_{i=1}^{N} w_i^2 DiffMV_i^2 / \sum_{i=1}^{N} w_i^2\right).$$

In one example, $$(DiffMV'^1, DiffMV'^2) =$$

$$\left(\text{Normalize}\left(\sum_{i=1}^{N} w_i^1 DiffMV_i^1, P1\right), \text{Normalize}\left(\sum_{i=1}^{N} w_i^2 DiffMV_i^2, P2\right)\right),$$

where $\sum_{i=1}^{N} w_i^1 = 2^{P1}$ and $\sum_{i=1}^{N} w_i^2 = 2^{P2}$.

In one example, $w_i^0 = w_i^1 = w_i^2$ for all i.

In one example, $DiffMV'^1$ and/or $DiffMV'^2$ is derived from some original CPMVs in one way. $MV'^0$ is derived in another way; And $(MV'^0, MV'^0 + DiffMV'^1)$ or $(MV'^0, MV'^0 + DiffMV'^1, MV'^0 + DiffMV'^2)$ is treated as the CPMVs of the combined affine model.

For example, $DiffMV'^1$ and/or $DiffMV'^2$ is derived by combining two affine coded spatial neighboring blocks. $MV'^0$ is copied or scaled from block A2 or block B2 or block B3 in FIG. 5.

In one example, only original CPMVs referring to the same reference picture can be combined.

Alternatively, CPMVs referring to different reference pictures should be scaled to the same reference picture before being combined.

More than one combined affine models can be derived and serve as affine MVP candidates or merge candidates In one example, affine parameters or CPMVs of each two affine coded spatial neighboring blocks are combined to generate a combined candidate with the affine parameters or CPMVs of a new affine model, and this combined affine model is added into the affine MVP candidate list or affine merge list.

In another example, temporary predictions generated from the affine models of each two affine coded spatial neighboring blocks are combined to generate the combined candidate with the combined prediction.

The combined candidate may be put into the candidate list after normal affine AMVP or merge candidates inherited from spatial neighboring blocks.

The number of combined candidate put into the candidate list cannot exceed a fixed number such as 5.

Multiple-hypothesis on affine prediction. In some embodiments, N (N≥2) temporary predictions for the current block may be firstly generated by N affine models, and the final prediction can be a combination of the temporary predictions. Suppose the N original predictions for the current block are denoted as $P_1(x,y), \ldots, P_N(x,y)$. The final prediction is denoted as $P'(x,y)$.

(a) For example, $P'(x,y) = F^{x,y}(P_1(x,y), \ldots, P_N(x,y))$, $F^{x,y}$ is a bundle of functions depending on the sample position (x,y).

(b) For example, $P'(x,y) = \text{Average}(P_1(x,y), \ldots, P_N(x,y))$.

(c) For example, $$P'(x, y) = \sum_{i=1}^{N} w_i^{(x,y)} P_i(x, y) / \sum_{i=1}^{N} w_i^{(x,y)}.$$

(d) For example, $$\text{Normalize}\left(\sum_{i=1}^{N} w_i^{(x,y)} P_i(x, y) / \sum_{i=1}^{N} w_i^{(x,y)}, S(x, y)\right),$$

where $\sum_{i=1}^{N} w_i^{(x,y)} = 2^{S(x,y)}$.

(e) In one example, $w_i^{(x,y)}$ is the same for all (x,y).

(f) In one example, $w_i^{(x,y)}$ is the same for all i.

(g) In one example, N=2 and $w_1^{(x,y)} = w_2^{(x,y)} = 1$ for all (x,y).

(h) In one example, $P_1(x,y), \ldots, P_N(x,y)$ should be generated by affine models referring to the same reference picture.

(i) Alternatively, $P_1(x,y), \ldots, P_N(x,y)$ should be generated by affine models referring to reference pictures in the same reference list.

(j) In one example, $P_1(x,y)$ and $P_2(x,y)$ cannot be combined to as a combined candidate if they are the two predictions referring to reference list 0 and reference list 1 of a bi-prediction candidate already in the candidate list.

9. Drawbacks of Existing Methods for Combined Affine Merge Candidates

In some existing implementations, pairwise average candidate is only applied on normal merge candidate list.

In other existing implementations, multiple hypotheses for affine models are not applied to the affine merge candidate list.

10. Exemplary Methods for Combined Affine Merge Candidates in Video Coding

Embodiments of the disclosed technology inherit the 6-parameter affine model with reduced memory requirements, and may improve video coding efficiency and enhance both existing and future video coding standards is elucidated in the following examples described for various implementations. In the following examples, which should not be construed to be limiting, the coordinate of the top-left corner/top-right corner/bottom-left corner/bottom-right corner of the affine coded above or left neighboring CU are (LTNx, LTNy)/(RTNx, RTNy)/(LBNx, LBNy)/(RBNx, RBNy), respectively; the coordinate of the top-left corner/top-right corner/bottom-left corner/bottom-right corner of the current CU are (LTCx,LTCy)/(RTCx, RTCy)/(LBCx, LBCy)/(RBCx, RBCy), respectively; the width and height of the affine coded above or left neighboring CU are w' and h', respectively; the width and height of the affine coded current CU are w and h, respectively.

Furthermore, MV is 2-dimension vector noted as (MVx, MVy). MV1+MV2=MV3 means MV1x+MV2x=MV3x and MV1y+MV2y=MV3y. k×MV1=MV2 means k×MV1x=MV2x and k×MV1y=MV2y. Average(MV1, MV2)=((MV1x+MV2x)>>1, (MV1y+MV2y)>>1) or Average(MV1, MV2)=((MV1x+MV2x+1)>>1, (MV1y+MV2y+1)>>1).

Although the following examples are described in the context of an "affine merge candidate list," they are equally applicable to other merge candidate lists, e.g. "sub-block merge candidate list" when other kinds of sub-block merge candidate such as ATMVP candidate is also put into the merge candidate list.

Example 1. In some embodiments, X (e.g. X=6) combined affine merge candidates are put into the affine merge candidate list.

(a) In one example, the combined affine merge candidates are put into the affine merge candidate list right after the neighboring inherited affine merge candidates have been put into the list.

(b) Alternatively, the combined affine merge candidates are put into the affine merge candidate list right after the constructed affine merge candidates have been put into the list.

Example 2. Suppose there are N (N>=2) affine merge candidates already in the affine candidate list with CPMVs $(MV^0_1, MV^1_1, MV^2_1) \ldots (MV^0_N, MV^1_N, MV^2_N)$. It should be noted that $MV^0$ s may be derived from $MV^1$s and $MV^2$s if the affine merge candidate S utilizes the 4-parameter model. In the following discussion, C1, C2 ... CK represents the indices of K affine merge candidate.

(a) In one example, the affine model of a combined affine merge candidate is generated as a multiple-hypothesis affine model.

(i) A combined affine model with CPMVs $(MV'^0, MV'^1, MV'^2)$ can be derived from affine models of M (such as 2) affine merge candidates in the first K (such as 4) affine merge candidates already in the affine merge candidate list.

(ii) A combined affine model with CPMVs $(MV'^0, MV'^1, MV'^2)$ can be derived from affine models of M (such as 2) affine merge candidates in the last K (such as 4) affine merge candidates already in the affine merge candidate list.

(iii) In one example, a combined affine merge candidate is derived as $(MV'^0, MV'^1, MV'^2)$=(Average($MV^0_{C1}, MV^0_{C2}$), Average($MV^1_{C1}, MV^1_{C2}$), Average($MV^2_{C1}, MV^2_{C2}$)). Alternatively, $(MV'^0, MV'^1)$, (Average($MV^0_{C1}, MV^0_{C2}$), Average($MV^1_{C1}, MV^1_{C2}$)) and the current block applies the 4-parameter affine model.

(iv) In one example, $DiffMV^1_{C1}=MV^1_{C1}-MV^0_{C1}$ and $DiffMV^2_{C1}=MV^2_{C1}-MV^0_{C1}$, $DiffMV^1_{C2}=MV^1_{C2}-MV^0_{C2}$ and $DiffMV^2_{C2}=MV^2_{C2}-MV^0_{C2}$. Then $(MV'^0, MV'^1, MV'^2)=(MV^0_{C1}, MV^0_{C1}+$Average$(DiffMV^1_{C1}, DiffMV^1_{C2}), MV^0_{C1}+$Average$(DiffMV^2_{C1}, DiffMV^2_{C2}))$. Alternatively, $(MV'^0, MV'^1)=(MV^0_{C1}, MV^0_{C1}+$Average$(DiffMV^1_{C1}, DiffMV^1_{C2}))$ and the current block applies the 4-parameter affine model.

(v) In one example, $DiffMV^1_{C1}=MV^1_{C1}-MV^0_{C1}$ and $DiffMV^2_{C1}=MV^2_{C1}-MV^0_{C1}$, $DiffMV^1_{C2}=MV^1_{C2}-MV^0_{C2}$ and $DiffMV^2_{C2}=MV^2_{C2}-MV^0_{C2}$. Then $(MV'^0, MV'^1, MV'^2)=(MV^0_{C3}, MV^0_{C3}+$Average$(DiffMV^1_{C1}, DiffMV^1_{C2}), MV^0_{C3}+$Average$(DiffMV^2_{C1}, DiffMV^2_{C2}))$. Alternatively, $(MV'^0, MV'^1)=(MV^0_{C3}, MV^0_{C3}+$Average$(DiffMV^1_{C1}, DiffMV^1_{C2}))$ and the current block applies the 4-parameter affine model.

(vi) In one example, $DiffMV^1_{C1}=MV^1_{C1}-MV^0_{C1}$ and $DiffMV^2_{C1}=MV^2_{C1}-MV^0_{C1}$. Then $(MV'^0, MV'^1, MV'^2)=($Average$(MV^0_{C1}, MV^0_{C2}),$ Average$(MV^0_{C1}, MV^0_{C2})+DiffMV^1_{C1},$ Average$(MV^0_{C1}, MV^0_{C2})+DiffMV^2_{C1})$. Alternatively, $(MV'^0, MV'^1)=($Average$(MV^0_{C1}, MV^0_{C2}),$ Average$(MV^0_{C1}, MV^0_{C2})+DiffMV^1_{C1}$, and the current block applies the 4-parameter affine model.

(vii) In one example, $DiffMV^1_{C1}=MV^1_{C1}-MV^0_{C1}$ and $DiffMV^2_{C1}=MV^2_{C1}-MV^0_{C1}$. Then $(MV'^0, MV'^1, MV'^2)=($Average$(MV^0_{C2}, MV^0_{C3}),$ Average$(MV^0_{C2}, MV^0_{C3})+DiffMV^1_{C1},$ Average$(MV^0_{C2}, MV^0_{C3})+DiffMV^2_{C1})$. Alternatively, $(MV'^0, MV'^1)=($Average$(MV^0_{C2}, MV^0_{C3}),$ Average$(MV^0_{C2}, MV^0_{C3})+DiffMV^1_{C1}$, and the current block applies the 4-parameter affine model.

(viii) If $(MV^0_{C1}, MV^1_{C1}, MV^2_{C1})$ and $(MV^0_{C2}, MV^1_{C2}, MV^2_{C2})$ refers to different reference pictures then:

(1) For example, they are scaled to the same reference picture before the combination process. The same reference picture can be one of the two different reference pictures, such as the one with a smaller reference index or the one with a smaller POC distance to the current picture, or it can be a fixed reference picture such as the reference picture with reference index equal to 0.

(2) Alternatively, they are combined without any scaling.

(3) Alternatively, they cannot be combined.

(ix) Several pairs of C1, C2 can be used to derive the combined affine merge candidates with one or some methods above, and these candidates are put into the affine merge candidate list in a predefined order. For example, pairs {(0, 1), (0, 2), (1, 2), (0, 3), (1, 3), (2, 3)} are used to derive the combined affine merge candidates and then put into the affine merge candidate list in order.

(1) If one candidate with a index in a pair is not available, then this pair is skipped and not to derive a combined affine merge candidate.

(2) If one candidate with an index in a pair is a combined affine merge candidate, then this pair is skipped and not to derive a combined affine merge candidate.

(3) If one candidate with an index in a pair is a constructed affine merge candidate, then this pair is skipped and not to derive a combined affine merge candidate.

(4) If one candidate with an index in a pair is an ATMVP (or a spatial TMVP) merge candidate, then this pair is skipped and not to derive a combined affine merge candidate.

(5) If one candidate with an index in a pair is a zero affine merge candidate, then this pair is skipped and not to derive a combined affine merge candidate.

(x) Several groups of C1, C2 and C3 can be used to derive the combined affine merge candidates with one or some methods above, and these candidates are put into the affine merge candidate list in a predefined order. For example, groups {(0, 1, 2), (1, 2, 3), (0, 1, 3), (0, 2, 3), (1, 0, 2), (1, 0, 3)} are used to derive the combined affine merge candidates and then put into the affine merge candidate list in order.

(1) If one candidate with an index in a group is not available, then this pair is skipped and not to derive a combined affine merge candidate.
(2) If one candidate with an index in a group is a combined affine merge candidate, then this pair is skipped and not to derive a combined affine merge candidate.
(3) If one candidate with an index in a group is a constructed affine merge candidate, then this pair is skipped and not to derive a combined affine merge candidate.
(4) If one candidate with an index in a group is an ATMVP (or a spatial TMVP) merge candidate, then this pair is skipped and not to derive a combined affine merge candidate.
(5) If one candidate with an index in a group is a zero affine merge candidate, then this pair is skipped and not to derive a combined affine merge candidate.

(xi) The combined affine merge candidates may be generated with any other methods, such as the multiple-hypothesis on affine prediction methods.

Example 3. In one example, a combined affine merge candidate is compared with existing affine merge candidates already in the list. If it is identical to an existing one, then it is not put into the list. The procedure is called "pruning". Alternatively, a combined affine merge candidate is not compared with existing affine merge candidates. In other words, no pruning process.

Example 4. In one example, whether to and how to generate the combined affine merge candidate may depend on the inter directions (List 0 prediction, List 1 prediction, or Bi-prediction) of the affine merge candidates X0 and X1, which are used to generate the combined affine merge candidate.

(a) In one example, if X0 applies List 0 prediction and X1 applies List 1 prediction, then the combined affine merge candidate will apply Bi-prediction, with CPMVs in List 0 equal to CPMVs of X0 and CPMVs in List 1 equal to CPMVS of X1.

(b) In one example, if X0 applies List 1 prediction and X1 applies List 0 prediction, then the combined affine merge candidate will apply Bi-prediction, with CPMVs in List 0 equal to CPMVs of X1 and CPMVs in List 1 equal to CPMVS of X0.

(c) In one example, if X0 applies List 0 prediction and X1 applies List 0 prediction, then the combined affine merge candidate will apply List 0 prediction, with CPMVs in List 0 equal to a combination of CPMVs of X0 and CPMVs of X1 with a combining method as described in Example 2.

(d) In one example, if X0 applies List 0 prediction and X1 applies List 0 prediction, then the combined affine merge candidate will apply Bi-prediction, with CPMVs in List 0 equal to CPMVs of X0 and CPMVs of X1 with a combining method as described in Example 2.

(e) In one example, if X0 applies List 1 prediction and X1 applies List 1 prediction, then the combined affine merge candidate will apply List 1 prediction, with CPMVs in List 1 equal to a combination of CPMVs of X0 and CPMVs of X1 with a combining method as described in Example 2.

(f) In one example, if X0 applies List 0 prediction and X1 applies Bi prediction, then the combined affine merge candidate will apply Bi-prediction, with CPMVs in List 0 equal to a combination of CPMVs of X0 and CPMVs in List 0 of X1 with a combining method as described in Example 2, and CPMVs in List 1 equal to CPMVs in List 1 of X1.

(g) In one example, if X0 applies List 1 prediction and X1 applies Bi prediction, then the combined affine merge candidate will apply Bi-prediction, with CPMVs in List 1 equal to a combination of CPMVs of X0 and CPMVs in List 1 of X1 with a combining method as described in Example 2, and CPMVs in List 0 equal to CPMVs in List 0 of X1.

(h) In one example, if X1 applies List 0 prediction and X0 applies Bi prediction, then the combined affine merge candidate will apply Bi-prediction, with CPMVs in List 0 equal to a combination of CPMVs of X1 and CPMVs in List 0 of X0 with a combining method as described in Example 2, and CPMVs in List 1 equal to CPMVs in List 1 of X0.

(i) In one example, if X1 applies List 1 prediction and X0 applies Bi prediction, then the combined affine merge candidate will apply Bi-prediction, with CPMVs in List 1 equal to a combination of CPMVs of X1 and CPMVs in List 1 of X0 with a combining method as described in Example 2, and CPMVs in List 0 equal to CPMVs in List 0 of X0.

Figure 7:
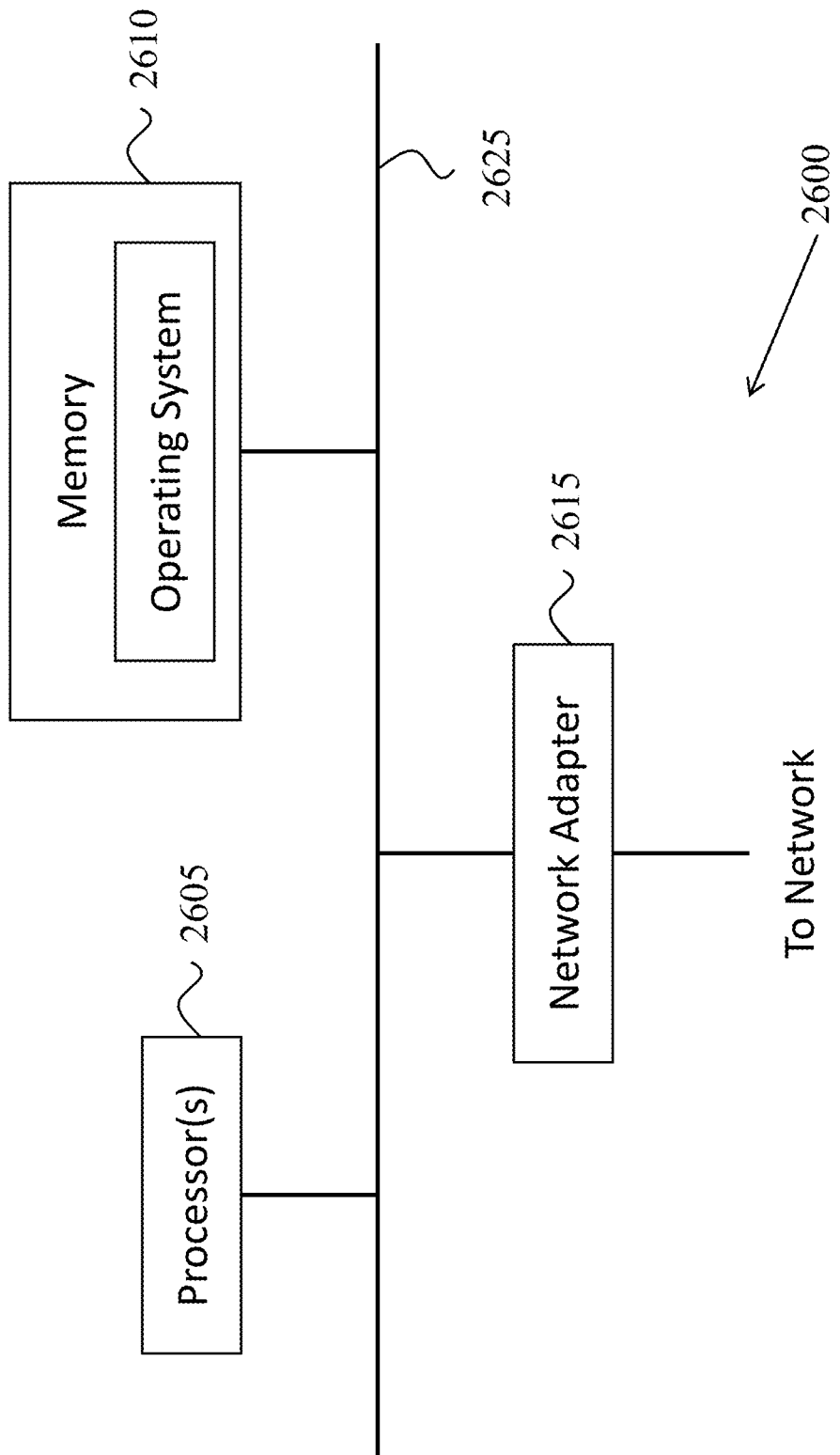
FIG. 7 is a block diagram illustrating an example of the architecture for a computer system or other control device that can be utilized to implement various portions of the presently disclosed technology.

FIG. 7 is a block diagram illustrating an example of the architecture for a computer system or other control device 2600 that can be utilized to implement various portions of the presently disclosed technology. In FIG. 7, the computer system 2600 includes one or more processors 2605 and memory 2610 connected via an interconnect 2625. The interconnect 2625 may represent any one or more separate physical buses, point to point connections, or both, connected by appropriate bridges, adapters, or controllers. The interconnect 2625, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 2605 may include central processing units (CPUs) to control the overall operation of, for example, the host computer. In certain embodiments, the processor(s) 2605 accomplish this by executing software or firmware stored in memory 2610. The processor(s) 2605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 2610 can be or include the main memory of the computer system. The memory 2610 represents any suitable form of random access memory (RAM), read-only memory (ROM), flash memory, or the like, or a combination of such devices. In use, the memory 2610 may contain, among other things, a set of machine instructions which, when executed by processor 2605, causes the processor 2605 to perform operations to implement embodiments of the presently disclosed technology.

Also connected to the processor(s) 2605 through the interconnect 2625 is a (optional) network adapter 2615. The network adapter 2615 provides the computer system 2600 with the ability to communicate with remote devices, such as the storage clients, and/or other storage servers, and may be, for example, an Ethernet adapter or Fiber Channel adapter.

Figure 8:
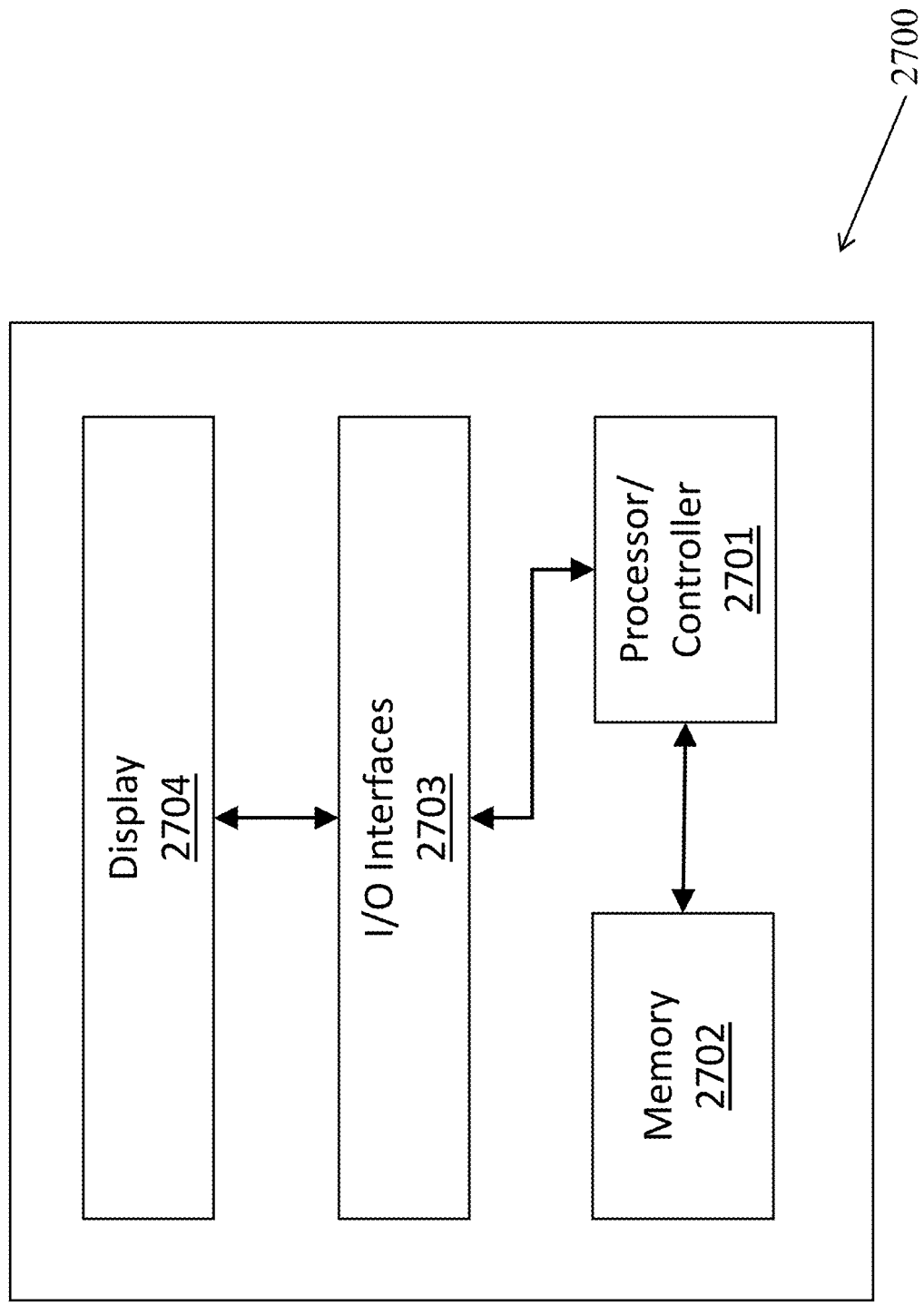
FIG. 8 shows a block diagram of an example embodiment of a mobile device that can be utilized to implement various portions of the presently disclosed technology.

FIG. 8 shows a block diagram of an example embodiment of a mobile device 2700 that can be utilized to implement various portions of the presently disclosed technology. The mobile device 2700 can be a laptop, a smartphone, a tablet, a camcorder, or other types of devices that are capable of processing videos. The mobile device 2700 includes a processor or controller 2701 to process data, and memory 2702 in communication with the processor 2701 to store and/or buffer data. For example, the processor 2701 can include a central processing unit (CPU) or a microcontroller unit (MCU). In some implementations, the processor 2701 can include a field-programmable gate-array (FPGA). In some implementations, the mobile device 2700 includes or is in communication with a graphics processing unit (GPU), video processing unit (VPU) and/or wireless communications unit for various visual and/or communications data processing functions of the smartphone device. For example, the memory 2702 can include and store processor-executable code, which when executed by the processor 2701, configures the mobile device 2700 to perform various operations, e.g., such as receiving information, commands, and/or data, processing information and data, and transmitting or providing processed information/data to another device, such as an actuator or external display. To support various functions of the mobile device 2700, the memory 2702 can store information and data, such as instructions, software, values, images, and other data processed or referenced by the processor 2701. For example, various types of Random Access Memory (RAM) devices, Read Only Memory (ROM) devices, Flash Memory devices, and other suitable storage media can be used to implement storage functions of the memory 2702. In some implementations, the mobile device 2700 includes an input/output (I/O) unit 2703 to interface the processor 2701 and/or memory 2702 to other modules, units or devices. For example, the I/O unit 2703 can interface the processor 2701 and memory 2702 with to utilize various types of wireless interfaces compatible with typical data communication standards, e.g., such as between the one or more computers in the cloud and the user device. In some implementations, the mobile device 2700 can interface with other devices using a wired connection via the I/O unit 2703. The mobile device 2700 can also interface with other external interfaces, such as data storage, and/or visual or audio display devices 2704, to retrieve and transfer data and information that can be processed by the processor, stored in the memory, or exhibited on an output unit of a display device 2704 or an external device. For example, the display device 2704 can display a video frame modified based on the MVPs in accordance with the disclosed technology.

The examples described above may be incorporated in the context of the methods described below, e.g., method 900, which may be implemented at a video decoder/encoder.

Figure 9:
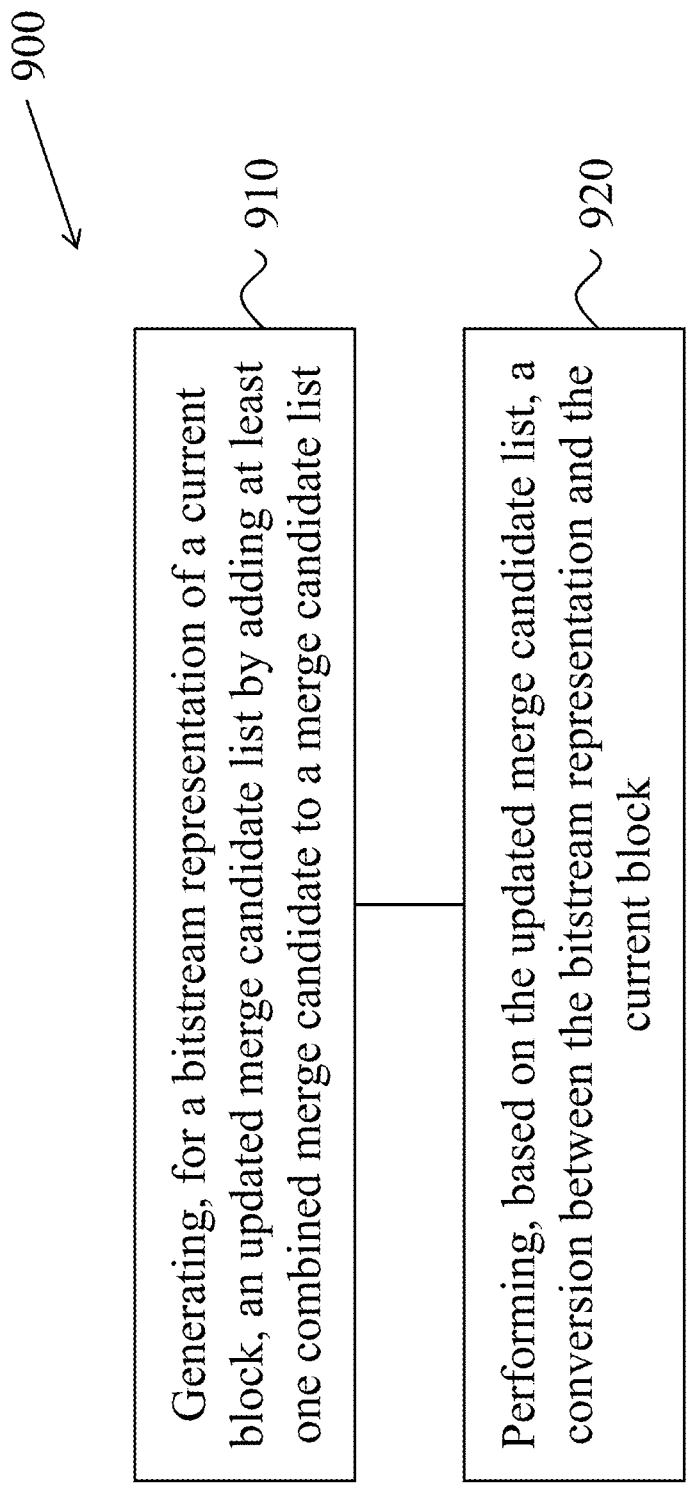
FIG. 9 is a flowchart for an example method of video processing.

FIG. 9 shows a flowchart of an exemplary method for video coding. The method 900 includes, at step 910, generating, for a bitstream representation of a current block, an updated merge candidate list by adding at least one combined merge candidate to a merge candidate list. In some embodiments, the at least one combined merge candidate may include one or more combined affine merge candidates.

In some embodiments, the at least one combined merge candidate is added to a first merge candidate list that includes sub-block prediction based merge candidates like affine or ATMVP merge candidates. The first merge candidate list is different from a second merge candidate list that includes normal merge candidates (e.g., HEVC merge candidates). In other words, the at least one combined merge candidate may be stored separately from normal HEVC merge candidates, and along with other sub-block prediction based merge candidates.

In some embodiments, and in the context of Example 1, the method 900 further includes the step of adding, immediately prior to the generating, one or more neighboring inherited affine merge candidates to the merge candidate list.

In some embodiments, and in the context of Example 1, the method 900 further includes the step of adding, immediately prior to the generating, one or more constructed affine merge candidates to the merge candidate list.

In the following embodiments and examples, which are described in the context of Example 2, the merge candidate list comprises N≥2 affine merge candidates.

In some embodiments, the at least one combined merge candidate is based on M of the N affine merge candidates, wherein the M of the N affine merge candidates are selected from a first K of the N affine merge candidates, and wherein M and K are integers.

In some embodiments, the at least one combined merge candidate is based on M of the N affine merge candidates, wherein the M of the N affine merge candidates are selected from a last K of the N affine merge candidates, and wherein M and K are integers.

In an example, M=2 and K=4.

In some embodiments, the at least one combined merge candidate comprises a first combined merge candidate with control point motion vectors (CPMVs) denoted ($MV'^0$, $MV'^1$, $MV'^2$), and wherein the N affine merge candidates comprise a first affine merge candidate with CPMVs denoted ($MV^0_{C1}$, $MV^1_{C1}$, $MV^2_{C1}$) and a second affine merge candidate with CPMVs denoted ($MV^0_{C2}$, $MV^1_{C2}$, $MV^2_{C2}$). In one example, $MV'^0$=Average($MV^0_{C1}$, $MV^0_{C2}$), $MV'^1$=Average($MV^1_{C1}$, $MV^1_{C2}$) and $MV'^2$=Average($MV^2_{C1}$, $MV^2_{C2}$). In another example, $MV'^0$=$MV^0_{C1}$, $MV'^1$=$MV^0_{C1}$+Average($DiffMV^1_{C1}$, $DiffMV^1_{C2}$) and $MV'^2$=$MV^0_{C1}$+Average($DiffMV^2_{C1}$, $DiffMV^2_{C2}$), wherein $DiffMV^1_{C1}$=$MV^1_{C1}$−$MV^0_{C1}$ and $DiffMV^2_{C1}$=$MV^2_{C1}$−$MV^0_{C1}$, $DiffMV^1_{C2}$=$MV^1_{C2}$−$MV^0_{C2}$ and $DiffMV^2_{C2}$=$MV^2_{C2}$−$MV^0_{C2}$.

In some embodiments, the first affine merge candidate is associated with a first reference picture, and the second affine merge candidate is associated with a second reference picture that is different from the first reference picture.

In some embodiments, and in the context of Example 3, the step of generating the updated merge candidate list may further include determining that a first combined merge candidate of the at least one combined merge candidate is not identical to any merge candidate in the merge candidate list, and adding the first combined merge candidate to the merge candidate list.

In some embodiments, and in the context of Example 3, the method 900 may include the steps of determining that a second combined merge candidate of the at least at least one combined merge candidate is identical to at least one merge candidate in the merge candidate list, and excluding the second combined merge candidate from the merge candidate list.

In some embodiments, and in the context of Example 4, the method 900 may further include generating, based on inter directions of two affine merge candidates in the merge candidate list, the at least one combined merge candidate.

The method 900 includes, at step 920, performing, based on the updated merge candidate list, a conversion between the bitstream representation and the current block. In some embodiments, the conversion generates the current block from the bitstream representation (e.g., as might be implemented in a video decoder). In other embodiments, the conversion generates the bitstream representation from the current block (e.g., as might be implemented in a video encoder).

Figure 10:
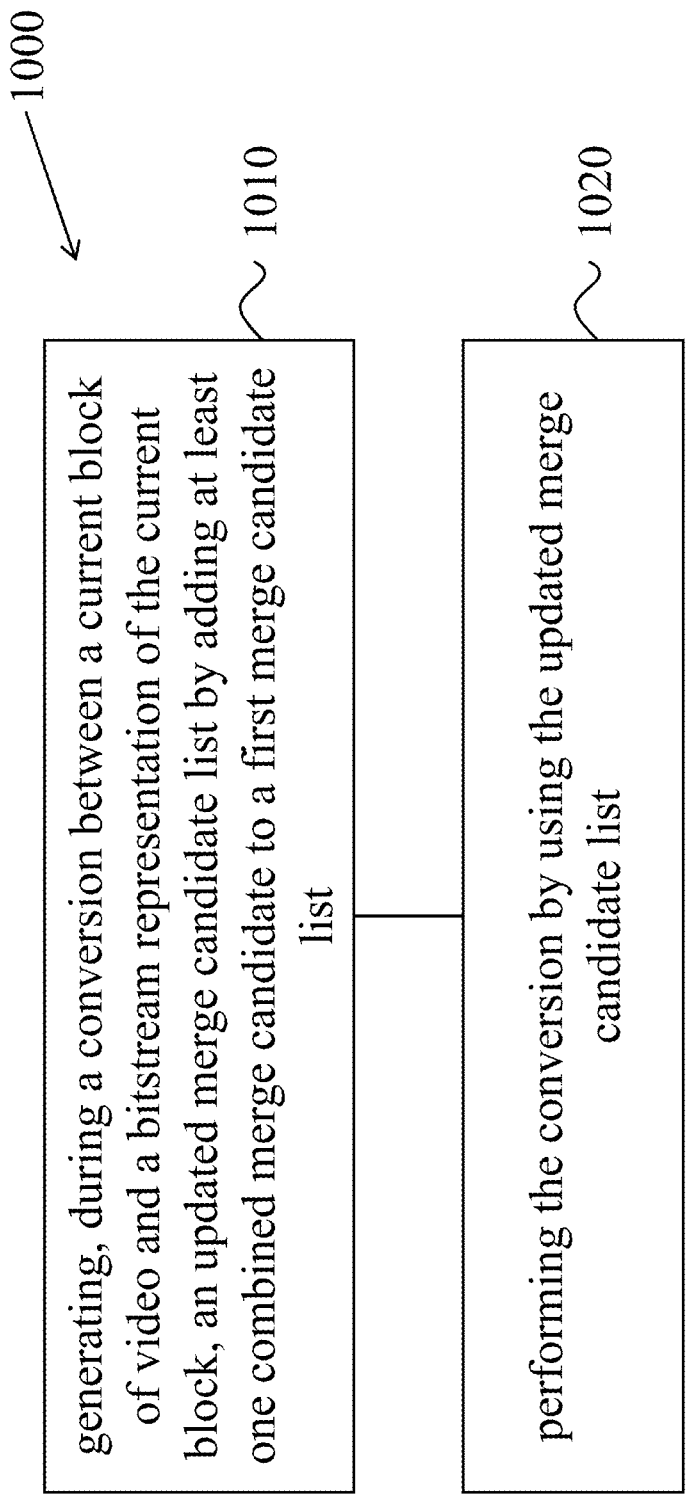
FIG. 10 is a flowchart for another example method of video processing.

FIG. 10 is a flowchart representation of a method 1000 of video coding. The method 1000 includes generating (1010), during a conversion between a current block of video and a bitstream representation of the current block, an updated merge candidate list by adding at least one combined merge candidate to a first merge candidate list; and performing (1020), the conversion by using the updated merge candidate list.

In some embodiments, the first merge candidate list comprises one or more sub-block prediction based merge candidates.

In some embodiments, the one or more sub-block prediction based merge candidates comprise affine merge candidates or advanced temporal motion vector prediction (ATMVP) merge candidates.

In some embodiments, the conversion generates the current block from the bitstream representation.

In some embodiments, the conversion generates the bitstream representation from the current block.

In some embodiments, the at least one combined merge candidate comprises one or more combined affine merge candidates.

In some embodiments, the method further comprising: immediately after adding one or more neighboring inherited affine merge candidates to the first merge candidate list, adding the at least one combined merge candidate to the first merge candidate list.

In some embodiments, the method further comprising: immediately after adding one or more constructed affine merge candidates to the first merge candidate list, adding the at least one combined merge candidate to the first merge candidate list.

In some embodiments, the first merge candidate list includes a first affine merge candidate list comprising multiple affine merge candidates with control point motion vectors, and a combined affine model with control point motion vectors (CPMVs) of the at least one combined merge candidate are derived based on the multiple affine merge candidates.

In some embodiments, the combined affine model with control point motion vectors (CPMVs) of the at least one combined merge candidate is derived from affine models of M affine merge candidates in K affine merge candidates, wherein the K affine merge candidates are the first K affine merge candidates of the multiple affine merge candidates in the first affine merge candidate list, and wherein M and K are integers, K is larger or equal to M.

In some embodiments, a combined affine model with control point motion vectors (CPMVs) of the at least one combined merge candidate is derived from affine models of M affine merge candidates in K affine merge candidates, wherein the K affine merge candidates are the last K affine merge candidates prior to the at least one combined merge candidate in the first affine merge candidate list, and wherein M and K are integers, K is larger or equal to M.

In some embodiments, when the current block applies a 6-parameter affine model, the at least one combined merge candidate comprises a first combined merge candidate with control point motion vectors (CPMVs) denoted ($MV'^0$, $MV'^1$, $MV'^2$), and wherein the multiple affine merge candidates comprise a first affine merge candidate with CPMVs denoted ($MV^0_{C1}$, $MV^1_{C1}$, $MV^2_{C1}$) and a second affine merge candidate with CPMVs denoted ($MV^0_{C2}$, $MV^1_{C2}$, $MV^2_{C2}$) and/or a third affine merge candidate with CPMVs denoted ($MV^0_{C3}$, $MV^1_{C3}$, $MV^2_{C3}$), C1, C2, C3 represents the indices of the multiple affine merge candidate.

In some embodiments, the at least one combined merge candidate is derived as ($MV'^0$, $MV'^1$, $MV'^2$)=(Average($MV^0_{C1}$,$MV^0_{C2}$), Average($MV^1_{C1}$, $MV^1_{C2}$), Average($MV^2_{C1}$, $MV^2_{C2}$)), and wherein Average(A, B) is an average of A and B.

In some embodiments, the at least one combined merge candidate is derived as ($MV'^0$, $MV'^1$, $MV'^2$)=($MV^0_{C1}$, $MV^0_{C1}$+Average($DiffMV^1_{C1}$, $DiffMV^1_{C2}$), $MV^0_{C1}$+Average($DiffMV^2_{C1}$, $DiffMV^2_{C2}$)), wherein $DiffMV^1_{C1}$=$MV^1_{C1}$−$MV^0_{C1}$ and $DiffMV^2_{C1}$=$MV^2_{C1}$−$MV^0_{C1}$, $DiffMV^1_{C2}$=$MV^1_{C2}$−$MV^0_{C2}$ and $DiffMV^2_{C2}$=$MV^2_{C2}$−$MV^0_{C2}$, and wherein Average(A, B) is an average of A and B.

In some embodiments, the at least one combined merge candidate is derived as ($MV'^0$, $MV'^1$, $MV'^2$)=($MV^0_{C3}$, $MV^0_{C3}$+Average($DiffMV^1_{C1}$, $DiffMV^1_{C2}$), $MV^0_{C3}$+Average($DiffMV^2_{C1}$, $DiffMV^2_{C2}$)), wherein $DiffMV^1_{C1}$=$MV^1_{C1}$−$MV^0_{C1}$ and $DiffMV^2_{C1}$=$MV^2_{C1}$−$MV^0_{C1}$, $DiffMV^1_{C2}$=$MV^1_{C2}$−$MV^0_{C2}$ and $DiffMV^2_{C2}$=$MV^2_{C2}$−$MV^0_{C2}$, and wherein Average(A, B) is an average of A and B.

In some embodiments, the at least one combined merge candidate is derived as ($MV'^0$, $MV'^1$, $MV'^2$)=(Average($MV^0_{C1}$, $MV^0_{C2}$), Average($MV^0_{C1}$, $MV^0_{C2}$)+$DiffMV^1_{C1}$, Average($MV^0_{C1}$, $MV^0_{C2}$)+$DiffMV^2_{C1}$), and wherein $DiffMV^1_{C1}$=$MV^i_{C1}$−$MV^0_{C1}$ and $DiffMV^2_{C1}$=$MV^2_{C1}$−$MV^0_{C1}$ and Average(A, B) is an average of A and B.

In some embodiments, the at least one combined merge candidate is derived as ($MV'^0$, $MV'^1$, $MV'^2$)=(Average($MV^0_{C2}$, $MV^0_{C3}$), Average($MV^0_{C2}$, $MV^0_{C3}$)+$DiffMV^1_{C1}$, Average($MV^0_{C2}$, $MV^0_{C3}$)+$DiffMV^2_{C1}$), wherein $DiffMV^1_{C1}$=$MV^1_{C1}$−$MV^0_{C1}$ and $DiffMV^2_{C1}$=$MV^2_{C1}$−$MV^0_{C1}$ and Average(A, B) is an average of A and B.

In some embodiments, when the current block applies a 4-parameter affine model, the at least one combined merge candidate comprises a first combined merge candidate with control point motion vectors (CPMVs) denoted ($MV'^0$, $MV'^1$), and wherein the multiple affine merge candidates comprise a first affine merge candidate with CPMVs denoted ($MV^0_{C1}$, $MV^1_{C1}$) and a second affine merge candidate with CPMVs denoted ($MV^0_{C2}$, $MV^1_{C2}$) and/or a third affine merge candidate with CPMVs denoted ($MV^0_{C3}$, $MV^1_{C3}$, $MV^2_{C3}$), C1, C2, C3 represents the indices of the multiple affine merge candidate.

In some embodiments, the at least one combined merge candidate is derived as ($MV'^0$, $MV'^1$)=(Average($MV^0_{C1}$, $MV^0_{C2}$), Average($MV^1_{C1}$, $MV^1_{C2}$)), and wherein Average (A, B) is an average of A and B.

In some embodiments, the at least one combined merge candidate is derived as ($MV'^0$, $MV'^1$)=($MV^0_{C1}$, $MV^0_{C1}$+Average($DiffMV^1_{C1}$, $DiffMV^1_{C2}$)), wherein $DiffMV^1_{C1}$=$MV^1_{C1}$−$MV^0_{C1}$, $DiffMV^1_{C2}$=$MV^1_{C2}$−$MV^0_{C2}$, and wherein Average(A, B) is an average of A and B.

In some embodiments, the at least one combined merge candidate is derived as ($MV'^0$, $MV'^1$)=($MV^0_{C3}$, $MV^0_{C3}$+Average($DiffMV^1_{C1}$, $DiffMV^1_{C2}$)), wherein $DiffMV^1_{C1}$=$MV^1_{C1}$−$MV^0_{C1}$, $DiffMV^1_{C2}$=$MV^1_{C2}$−$MV^0_{C2}$, and wherein Average(A, B) is an average of A and B.

In some embodiments, the at least one combined merge candidate is derived as ($MV'^0$, $MV'^1$)=(Average($MV^0_{C1}$, $MV^0_{C2}$), Average($MV^0_{C1}$, $MV^0_{C2}$)+$DiffMV^1_{C1}$), and wherein $DiffMV^1_{C1}$=$MV^i_{C1}$−$MV^0_{C1}$ and Average(A, B) is an average of A and B.

In some embodiments, the at least one combined merge candidate is derived as ($MV'^0$, $MV'^1$, $MV'^2$)=(Average ($MV^0_{C2}$, $MV^0_{C3}$), Average($MV^0_{C2}$, $MV^0_{C3}$)+$DiffMV_{C1}^1$), wherein $DiffMV_{C1}^1 = MV_{C1}^1 - MV_{C1}^0$ and Average(A, B) is an average of A and B.

In some embodiments, the CPMVs of the first affine merge candidate are associated with a first reference picture, and wherein the CPMVs of the second affine merge candidate are associated with a second reference picture that is different from the first reference picture.

In some embodiments, the CPMVs of the first affine merge candidate and the CPMVs of the second affine merge candidate are scaled to same reference picture before they are combined, wherein the same reference picture is one of the first reference picture and the second reference picture or a fixed reference picture.

In some embodiments, the CPMVs of the first affine merge candidate and the CPMVs of the second affine merge candidate are combined without any scaling.

In some embodiments, the CPMVs of the first affine merge candidate and the CPMVs of the second affine merge candidate cannot be combined.

In some embodiments, the at least one combined merge candidate is derived by using pairs of affine merge candidates of the multiple affine merge candidates, and the at least one combined merge candidate is put into the first affine merge candidate list in a predetermined order.

In some embodiments, if one affine merge candidate with an index in a pair of affine merge candidates is not available, or if one affine merge candidate with an index in a pair of affine merge candidates is a combined affine merge candidate, or if one affine merge candidate with an index in a pair of affine merge candidates is a constructed affine merge candidate, or if one affine merge candidate with an index in a pair of affine merge candidates is an advanced temporal motion vector prediction (ATMVP) merge candidate, or if one affine merge candidate with an index in a pair of affine merge candidates is a zero affine merge candidate, this pair is skipped and not used to derive the at least one combined affine merge candidate.

In some embodiments, the at least one combined merge candidate is derived by using groups of affine merge candidates of the multiple affine merge candidates, and the at least one combined merge candidate is put into the first affine merge candidate list in a predetermined order.

In some embodiments, if one affine merge candidate with an index in a group of affine merge candidates is not available, or if one affine merge candidate with an index in a group of affine merge candidates is a combined affine merge candidate, or if one affine merge candidate with an index in a group of affine merge candidates is a constructed affine merge candidate, or if one affine merge candidate with an index in a group of affine merge candidates is an advanced temporal motion vector prediction (ATMVP) merge candidate, or if one affine merge candidate with an index in a group of affine merge candidates is a zero affine merge candidate, this group is skipped and not used to derive the at least one combined affine merge candidate.

In some embodiments, the generating the updated merge candidate list comprises: determining whether a first combined merge candidate of the at least at least one combined merge candidate is identical to any merge candidate in the first merge candidate list; if no, adding the first combined merge candidate to the first merge candidate list, and if yes, discarding the first combined merge candidate.

In some embodiments, the method further comprising: generating, based on inter directions of a first affine merge candidate and a second affine merge candidate in the first merge candidate list, the at least one combined merge candidate.

In some embodiments, if the first affine merge candidate applies List 0 prediction and the second affine merge candidate applies List 1 prediction, the at least one combined affine merge candidate applies Bi-prediction, with CPMVs in List 0 equal to CPMVs of the first affine merge candidate and CPMVs in List 1 equal to CPMVS of the second affine merge candidate.

In some embodiments, if the first affine merge candidate applies List 1 prediction and the second affine merge candidate applies List 0 prediction, the at least one combined affine merge candidate applies Bi-prediction, with CPMVs in List 0 equal to CPMVs of the second affine merge candidate and CPMVs in List 1 equal to CPMVS of the first affine merge candidate.

In some embodiments, if the first affine merge candidate applies List 0 prediction and the second affine merge candidate applies List 0 prediction, the at least one combined affine merge candidate applies List 0 prediction, with CPMVs in List 0 equal to a combination of CPMVs of the first affine merge candidate and CPMVs of the second affine merge candidate.

In some embodiments, if the first affine merge candidate applies List 0 prediction and the second affine merge candidate applies List 0 prediction, the at least one combined affine merge candidate applies Bi-prediction, with CPMVs in List 0 equal to a combination of CPMVs of the first affine merge candidate and CPMVs of the second affine merge candidate.

In some embodiments, if the first affine merge candidate applies List 1 prediction and the second affine merge candidate applies List 1 prediction, the at least one combined affine merge candidate applies List 1 prediction, with CPMVs in List 1 equal to a combination of CPMVs of the first affine merge candidate and CPMVs of the second affine merge candidate.

In some embodiments, if the first affine merge candidate applies List 0 prediction and the second affine merge candidate applies Bi prediction, the at least one combined affine merge candidate applies Bi-prediction, with CPMVs in List 0 equal to a combination of CPMVs in List 0 of the first affine merge candidate and CPMVs in List 0 of the second affine merge candidate, and CPMVs in List 1 equal to CPMVs in List 1 of the second affine merge candidate.

In some embodiments, if the first affine merge candidate applies List 1 prediction and the second affine merge candidate applies Bi prediction, the at least one combined affine merge candidate applies Bi-prediction, with CPMVs in List 1 equal to a combination of CPMVs in List 1 of the first affine merge candidate and CPMVs in List 1 of the second affine merge candidate, and CPMVs in List 0 equal to CPMVs in List 0 of the second affine merge candidate.

In some embodiments, if the second affine merge candidate applies List 0 prediction and the first affine merge candidate applies Bi prediction, the at least one combined affine merge candidate applies Bi-prediction, with CPMVs in List 0 equal to a combination of CPMVs in List 0 of the second affine merge candidate and CPMVs in List 0 of the first affine merge candidate, and CPMVs in List 1 equal to CPMVs in List 1 of the first affine merge candidate.

In some embodiments, if the second affine merge candidate applies List 1 prediction and the first affine merge candidate applies Bi prediction, the at least one combined affine merge candidate applies Bi-prediction, with CPMVs in List 1 equal to a combination of CPMVs in List 1 of the second affine merge candidate and CPMVs in List 1 of the first affine merge candidate, and CPMVs in List 0 equal to a combination of CPMVs in List 0 of the first affine merge candidate and CPMVs in List 0 of the second affine merge candidate.

In some embodiments, the first merge candidate list is an affine merge candidate list or a sub-block merge candidate list.

Figure 11:
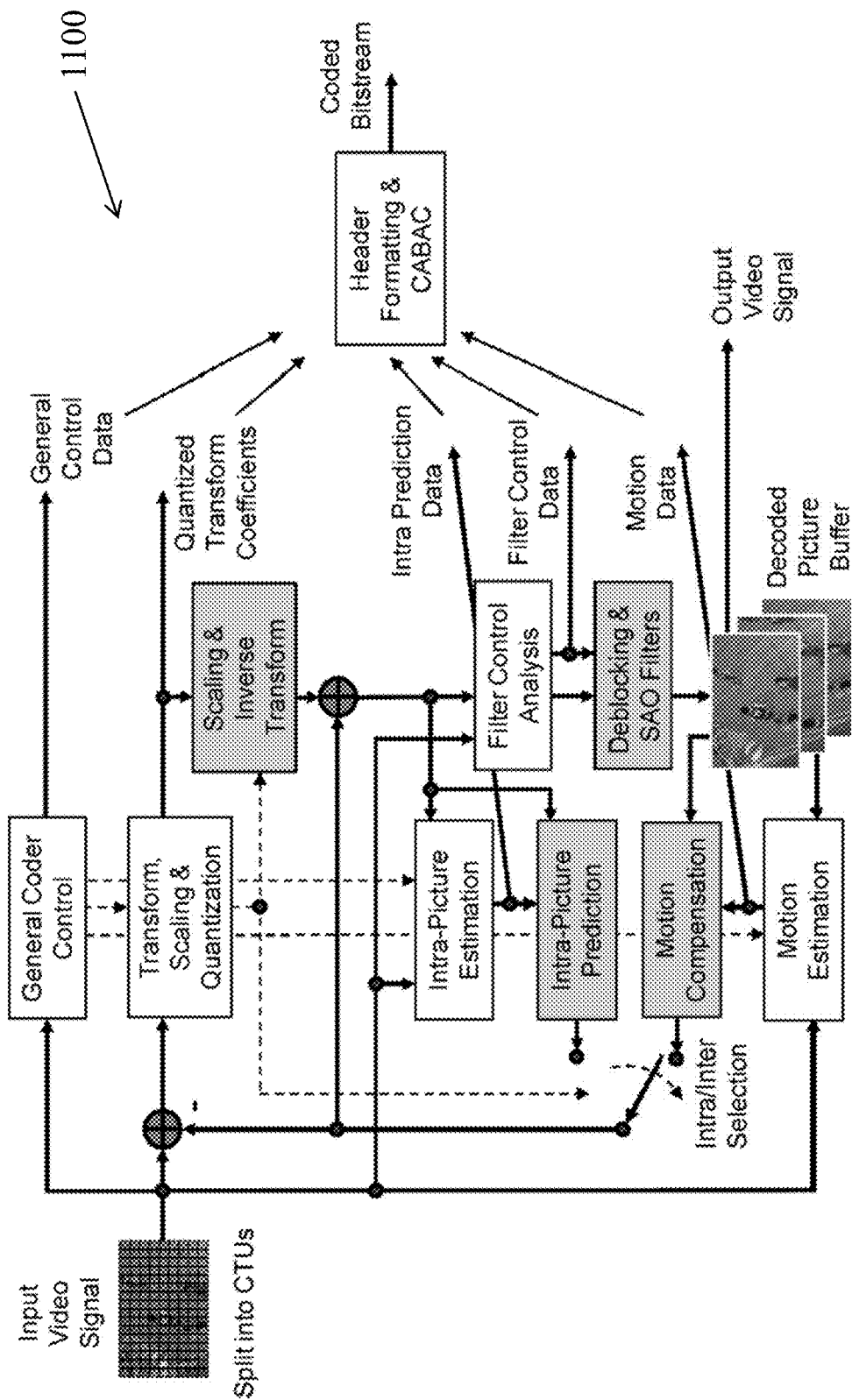
FIG. 11 shows an example block diagram of a typical High Efficiency Video Coding (HEVC) video encoder and decoder.

FIG. 11 shows an example block diagram of a typical HEVC video encoder and decoder 1100. An encoding algorithm producing an HEVC compliant bitstream would typically proceed as follows. Each picture is split into block-shaped regions, with the exact block partitioning being conveyed to the decoder. The first picture of a video sequence (and the first picture at each clean random access point into a video sequence) is coded using only intra-picture prediction (that uses some prediction of data spatially from region-to-region within the same picture, but has no dependence on other pictures). For all remaining pictures of a sequence or between random access points, inter-picture temporally predictive coding modes are typically used for most blocks. The encoding process for inter-picture prediction consists of choosing motion data comprising the selected reference picture and motion vector (MV) to be applied for predicting the samples of each block. The encoder and decoder generate identical inter-picture prediction signals by applying motion compensation (MC) using the MV and mode decision data, which are transmitted as side information.

The residual signal of the intra- or inter-picture prediction, which is the difference between the original block and its prediction, is transformed by a linear spatial transform. The transform coefficients are then scaled, quantized, entropy coded, and transmitted together with the prediction information.

The encoder duplicates the decoder processing loop (see gray-shaded boxes in FIG. 11) such that both will generate identical predictions for subsequent data. Therefore, the quantized transform coefficients are constructed by inverse scaling and are then inverse transformed to duplicate the decoded approximation of the residual signal. The residual is then added to the prediction, and the result of that addition may then be fed into one or two loop filters to smooth out artifacts induced by block-wise processing and quantization. The final picture representation (that is a duplicate of the output of the decoder) is stored in a decoded picture buffer to be used for the prediction of subsequent pictures. In general, the order of encoding or decoding processing of pictures often differs from the order in which they arrive from the source; necessitating a distinction between the decoding order (e.g., bitstream order) and the output order (e.g., display order) for a decoder.

Video material to be encoded by HEVC is generally expected to be input as progressive scan imagery (either due to the source video originating in that format or resulting from deinterlacing prior to encoding). No explicit coding features are present in the HEVC design to support the use of interlaced scanning, as interlaced scanning is no longer used for displays and is becoming substantially less common for distribution. However, a metadata syntax has been provided in HEVC to allow an encoder to indicate that interlace-scanned video has been sent by coding each field (i.e., the even or odd numbered lines of each video frame) of interlaced video as a separate picture or that it has been sent by coding each interlaced frame as an HEVC coded picture. This provides an efficient method of coding interlaced video without burdening decoders with a need to support a special decoding process for it.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of video processing, comprising:
   generating, during a conversion between a current block of video and a bitstream of the video, an updated merge candidate list by adding at least one combined merge candidate to a first merge candidate list; and
   performing the conversion by using the updated merge candidate list, wherein the first merge candidate list comprises one or more sub-block prediction-based merge candidates,
   wherein the first merge candidate list includes a first affine merge candidate list comprising multiple affine merge candidates with control point motion vectors, and a combined affine model with control point motion vectors (CPMVs) of the at least one combined merge candidate is derived based on the multiple affine merge candidates, wherein $(MV'^0, MV'^0+DiffMV'^1, MV'^0+DiffMV'^2, \ldots, MV'^0+DiffMV'^M)$ are treated as the CPMVs of the combined affine model, wherein $DiffMV'^M$ is derived by combining M affine coded spatial neighboring blocks and $MV'^0$ is copied or scaled from one of the M affine coded spatial neighboring blocks,
   wherein the M affine coded spatial neighboring blocks correspond to M affine merge candidates in K affine merge candidates, wherein (a) the K affine merge candidates are a last K affine merge candidates prior to the at least one combined merge candidate in the first affine merge candidate list, or
   (b) the K affine merge candidates are a first K affine merge candidates of the multiple affine merge candidates in the first affine merge candidate list,
   wherein M and K are integers, and wherein K is greater than or equal to M.

2. The method of claim 1, wherein the one or more sub-block prediction-based merge candidates comprise affine merge candidates or advanced temporal motion vector prediction (ATMVP) merge candidates.

3. The method of claim 1, wherein the conversion generates the current block from the bitstream.

4. The method of claim 1, wherein the conversion generates the bitstream from the current block.

5. The method of claim 1, wherein the at least one combined merge candidate comprises one or more combined affine merge candidates.

6. The method of claim 1, wherein when the current block applies a 6-parameter affine model, wherein the at least one combined merge candidate comprises a first combined merge candidate with CPMVs denoted $(MP'^0, MV'^2)$, wherein the multiple affine merge candidates comprise a first affine merge candidate with CPMVs denoted $(MV^0{}_{C1}, MV^1{}_{C1}, MV^2{}_{C1})$, a second affine merge candidate with CPMVs denoted $(MV^0{}_{C2}, MV^1{}_{C2}, MV^2{}_{C2})$ or a third affine merge candidate with CPMVs denoted $(MV^0{}_{C3}, MV^1{}_{C3}, MV^2{}_{C3})$, and wherein C1, C2, and C3 represent indices of the multiple affine merge candidates.

7. The method of claim 6, wherein the at least one combined merge candidate is derived as $(MV'^0, MV'^1, MV'^2)=($Average$(MV^0{}_{C1}, MV^0{}_{C2}),$ Average$(MV^1{}_{C1}, MV^1{}_{C2}),$ Average$(MV^2{}_{C1}, MV^2{}_{C2}))$, and wherein Average (A, B) is an average of A and B.

8. The method of claim 6, wherein the at least one combined merge candidate is derived as $(MV'^0, MV'^1, MV'^2)=(MV^0{}_{C1}, MV^0{}_{C1}+$Average$(DiffMV_{C1}{}^1, DiffMV_{C2}{}^1), MV^0{}_{C1}+$Average$(DiffMV_{C1}{}^2, DiffMV_{C2}{}^2))$, wherein $DiffMV_{C1}{}^1=MV_{C1}{}^1-MV_{C1}{}^0$ and $DiffMV_{C1}{}^2=MV_{C1}{}^2-MV_{C1}{}^0$, $DiffMV_{C2}{}^1=MV_{C2}{}^1-MV_{C2}{}^0$ and $DiffMV_{C2}{}^2=MV_{C2}{}^2-MV_{C2}{}^0$, and wherein Average(A, B) is an average of A and B.

9. The method of claim 1, wherein when the current block applies a 4-parameter affine model, wherein the at least one combined merge candidate comprises a first combined merge candidate with CPMVs denoted $(MV'^0, MV'^1)$, wherein the multiple affine merge candidates comprise a first affine merge candidate with CPMVs denoted $(MV^0{}_{C1}, MV^1{}_{C1})$ and a second affine merge candidate with CPMVs denoted $(MV^0{}_{C2}, MV^1{}_{C2})$ or a third affine merge candidate with CPMVs denoted $(MV^0{}_{C3}, MV^1{}_{C3}, MV^2{}_{C3})$, and wherein C1, C2, and C3 represent indices of the multiple affine merge candidates.

10. The method of claim 6, wherein the CPMVs of the first affine merge candidate are associated with a first reference picture, and wherein the CPMVs of the second affine merge candidate are associated with a second reference picture that is different from the first reference picture.

11. The method of claim 1, wherein the at least one combined merge candidate is derived by using pairs of affine merge candidates of the multiple affine merge candidates, and the at least one combined merge candidate is put into the first affine merge candidate list in a predetermined order.

12. The method of claim 11, wherein when one affine merge candidate with an index in a pair of affine merge candidates is
- not available, or
- a combined affine merge candidate, or
- a constructed affine merge candidate, or
- an advanced temporal motion vector prediction (ATMVP) merge candidate, or
- a zero affine merge candidate, the pair of affine merge candidates is skipped and not used to derive the at least one combined merge candidate.

13. The method of claim 1, wherein the at least one combined merge candidate is derived by using groups of affine merge candidates of the multiple affine merge candidates, wherein the at least one combined merge candidate is put into the first affine merge candidate list in a predetermined order, and
wherein when one affine merge candidate with an index in a group of affine merge candidates is
- not available, or
- a combined affine merge candidate, or
- a constructed affine merge candidate, or
- an advanced temporal motion vector prediction (ATMVP) merge candidate, or
- a zero affine merge candidate, the group of affine merge candidates is skipped and not used to derive the at least one combined merge candidate.

14. The method of claim 1, wherein the generating the updated merge candidate list comprises:
determining whether a first combined merge candidate of the at least one combined merge candidate is identical to any merge candidate in the first merge candidate list;
in response to the first combined merge candidate not being identical, adding the first combined merge candidate to the first merge candidate list, and
in response to the first combined merge candidate being identical, discarding the first combined merge candidate.

15. The method of claim 1, further comprising:
generating, based on inter directions of a first affine merge candidate and a second affine merge candidate in the first merge candidate list, the at least one combined merge candidate.

16. An apparatus for processing video data comprising a processor and a non-transitory memory with instructions thereon, wherein the instructions upon execution by the processor, cause the processor to:
generating, during a conversion between a current block of video and a bitstream of the video, an updated merge candidate list by adding at least one combined merge candidate to a first merge candidate list; and
performing the conversion by using the updated merge candidate list,
wherein the first merge candidate list comprises one or more sub-block prediction-based merge candidates,
wherein the first merge candidate list includes a first affine merge candidate list comprising multiple affine merge candidates with control point motion vectors, and a combined affine model with control point motion vectors (CPMVs) of the at least one combined merge candidate is derived based on the multiple affine merge candidates, wherein $(MV^{r0}, MV^{r0}+DiffMV^{r1}, MV^{r0}+DiffMV^{r2}, \ldots, MV^{r0}+DiffMV^{rM})$ are treated as the CPMVs of the combined affine model, wherein the $DiffMV^{rM}$ is derived by combining M affine coded spatial neighboring blocks and $MV^{r0}$ is copied or scaled from one of the M affine coded spatial neighboring blocks,
wherein the M affine coded spatial neighboring blocks correspond to M affine merge candidates in K affine merge candidates, wherein
(a) the K affine merge candidates are a last K affine merge candidates prior to the at least one combined merge candidate in the first affine merge candidate list, or
(b) the K affine merge candidates are a first K affine merge candidates of the multiple affine merge candidates in the first affine merge candidate list,
wherein M and K are integers, and wherein K is greater than or equal to M.

17. A non-transitory computer-readable recording medium storing a bitstream of a video which is generated by a method performed by a video processing apparatus, wherein the method comprises:
generating an updated merge candidate list by adding at least one combined merge candidate to a first merge candidate list; and
generating the bitstream based on the updated merge candidate list,
wherein the first merge candidate list comprises one or more sub-block prediction-based merge candidates,
wherein the first merge candidate list includes a first affine merge candidate list comprising multiple affine merge candidates with control point motion vectors, and a combined affine model with control point motion vectors (CPMVs) of the at least one combined merge candidate is derived based on the multiple affine merge candidates, wherein $(MV^{r0}, MV^{r0}+DiffMV^{r1}, MV^{r0}+DiffMV^{r2}, \ldots, MV^{r0}+DiffMV^{rM})$ are treated as the CPMVs of the combined affine model, wherein the $DiffMV^{rM}$ is derived by combining M affine coded spatial neighboring blocks and $MV^{r0}$ is copied or scaled from one of the M affine coded spatial neighboring blocks,
wherein the M affine coded spatial neighboring blocks correspond to M affine merge candidates in K affine merge candidates, wherein
(a) the K affine merge candidates are a last K affine merge candidates prior to the at least one combined merge candidate in the first affine merge candidate list, or
(b) the K affine merge candidates are a first K affine merge candidates of the multiple affine merge candidates in the first affine merge candidate list,
wherein M and K are integers, and wherein K is greater than or equal to M.

* * * * *

UNITED STATES PATENT AND TRADEMARK OFFICE
CERTIFICATE OF CORRECTION

PATENT NO. : 11,825,074 B2
APPLICATION NO. : 17/220301
DATED : November 21, 2023
INVENTOR(S) : Kai Zhang et al.

Page 1 of 1

It is certified that error appears in the above-identified patent and that said Letters Patent is hereby corrected as shown below:

In the Claims

In Column 26, Line 25, in Claim 6, delete "$MP^{i0}$" and insert -- $MV^{i0}, MV^{i1}$ --, therefor.

Signed and Sealed this
Eighth Day of October, 2024

Katherine Kelly Vidal
*Director of the United States Patent and Trademark Office*